(12) United States Patent
Hirai et al.

(10) Patent No.: US 10,691,394 B2
(45) Date of Patent: Jun. 23, 2020

(54) VIDEO DELIVERY APPARATUS, DISPLAY CONTROLLER, AND VIDEO DELIVERY SYSTEM

(71) Applicant: MITSUBISHI ELECTRIC CORPORATION, Tokyo (JP)

(72) Inventors: Hiroaki Hirai, Tokyo (JP); Yasunori Hoshihara, Tokyo (JP); Kiyotaka Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 103 days.

(21) Appl. No.: 15/775,585

(22) PCT Filed: Jan. 7, 2016

(86) PCT No.: PCT/JP2016/050319
§ 371 (c)(1),
(2) Date: May 11, 2018

(87) PCT Pub. No.: WO2017/119095
PCT Pub. Date: Jul. 13, 2017

(65) Prior Publication Data
US 2018/0329668 A1 Nov. 15, 2018

(51) Int. Cl.
*G06F 3/14* (2006.01)
*H04J 3/06* (2006.01)
*H04N 21/242* (2011.01)
*G09G 5/18* (2006.01)

(52) U.S. Cl.
CPC ............ *G06F 3/1446* (2013.01); *H04J 3/06* (2013.01); *H04N 21/242* (2013.01); *G09G 5/18* (2013.01);
(Continued)

(58) Field of Classification Search
CPC ............ G06F 3/1446; G09G 5/18; G09G 2340/0407; G09G 2370/04; H04N 21/242
See application file for complete search history.

(56) References Cited

U.S. PATENT DOCUMENTS 5,361,078 A * 11/1994 Caine ................... G06F 3/1446
345/1.3
6,037,925 A * 3/2000 Kim ..................... G09G 3/3611
345/99
(Continued)

FOREIGN PATENT DOCUMENTS

JP 5-249932 A 9/1993
JP 6-332426 A 12/1994
(Continued)

OTHER PUBLICATIONS

CQ Publishing, "Collection of Production with Application of Graphic Display Module," Oct. 15, 2012, pp. 178-179 (6 pages total), with a partial English translation.

*Primary Examiner* — Mihir K Rayan
(74) *Attorney, Agent, or Firm* — Birch, Stewart, Kolasch & Birch, LLP

(57) ABSTRACT

A video delivery apparatus includes: a division unit to divide video information corresponding to one screen, which is to be delivered to each of multiple display modules constituting a display, into pieces of video information each corresponding to the number of output lines, which is N times (N is an integer of one or greater) a line indicating pixels per one line of the corresponding display module, and output the pieces of video information corresponding to the number of output lines for each of the multiple display modules; and a delivery processor to deliver the video information corresponding to one screen of the display by repetitively delivering, to the multiple display modules, delivery data obtained by multiplexing the pieces of video information
(Continued)

corresponding to the number of output lines of the respective multiple display modules, output from the division unit, and control information indicating the target display modules to which the pieces of video information corresponding to the number of output lines are to be delivered respectively. Thus, it is possible to reduce the size of a memory held by a display controller.

12 Claims, 33 Drawing Sheets

(52) U.S. Cl.
CPC . *G09G 2340/0407* (2013.01); *G09G 2370/04* (2013.01)

(56) References Cited

U.S. PATENT DOCUMENTS

| | | | |
|---|---|---|---|
| 2002/0180719 A1* | 12/2002 | Nagai | G09G 3/32 345/206 |
| 2003/0212811 A1* | 11/2003 | Thornton | G06F 3/1431 709/231 |
| 2004/0222941 A1* | 11/2004 | Wong | G06F 3/1431 345/1.1 |
| 2005/0140567 A1* | 6/2005 | Ishizu | G06F 3/1431 345/1.3 |
| 2013/0181884 A1 | 7/2013 | Perkins et al. | |
| 2015/0186098 A1* | 7/2015 | Hall | H01H 11/04 345/1.3 |
| 2015/0340009 A1 | 11/2015 | Loeffler et al. | |

FOREIGN PATENT DOCUMENTS

| | | |
|---|---|---|
| JP | 2000-250505 A | 9/2000 |
| JP | 2002-189586 A | 7/2002 |
| JP | 2002-311932 A | 10/2002 |
| JP | 2005-134479 A | 5/2005 |
| JP | 2007-166204 A | 6/2007 |
| JP | 2012-124759 A | 6/2012 |

* cited by examiner

Fig. 9

| DISPLAY MODULE | ID | MODE | ORIENTATION | RESOLUTION [pix × pix] | NUMBER OF COLORS DISPLAYED [bit] | FREQUENCY [Hz] | NUMBER OF OUTPUT LINES |
|---|---|---|---|---|---|---|---|
| 26a | D1 | WVGA | LATERAL | 800 × 480 | 24 | 60 | 2 |
| 27a | D2 | QVGA | LATERAL | 320 × 240 | 24 | 60 | 1 |
| 27b | D3 | QVGA | LATERAL | 320 × 240 | 24 | 60 | 1 |
| 27c | D4 | QVGA | LATERAL | 320 × 240 | 24 | 60 | 1 |
| 27d | D5 | QVGA | LATERAL | 320 × 240 | 24 | 60 | 1 |
| 26b | D6 | WVGA | LATERAL | 800 × 480 | 24 | 60 | 2 |

41

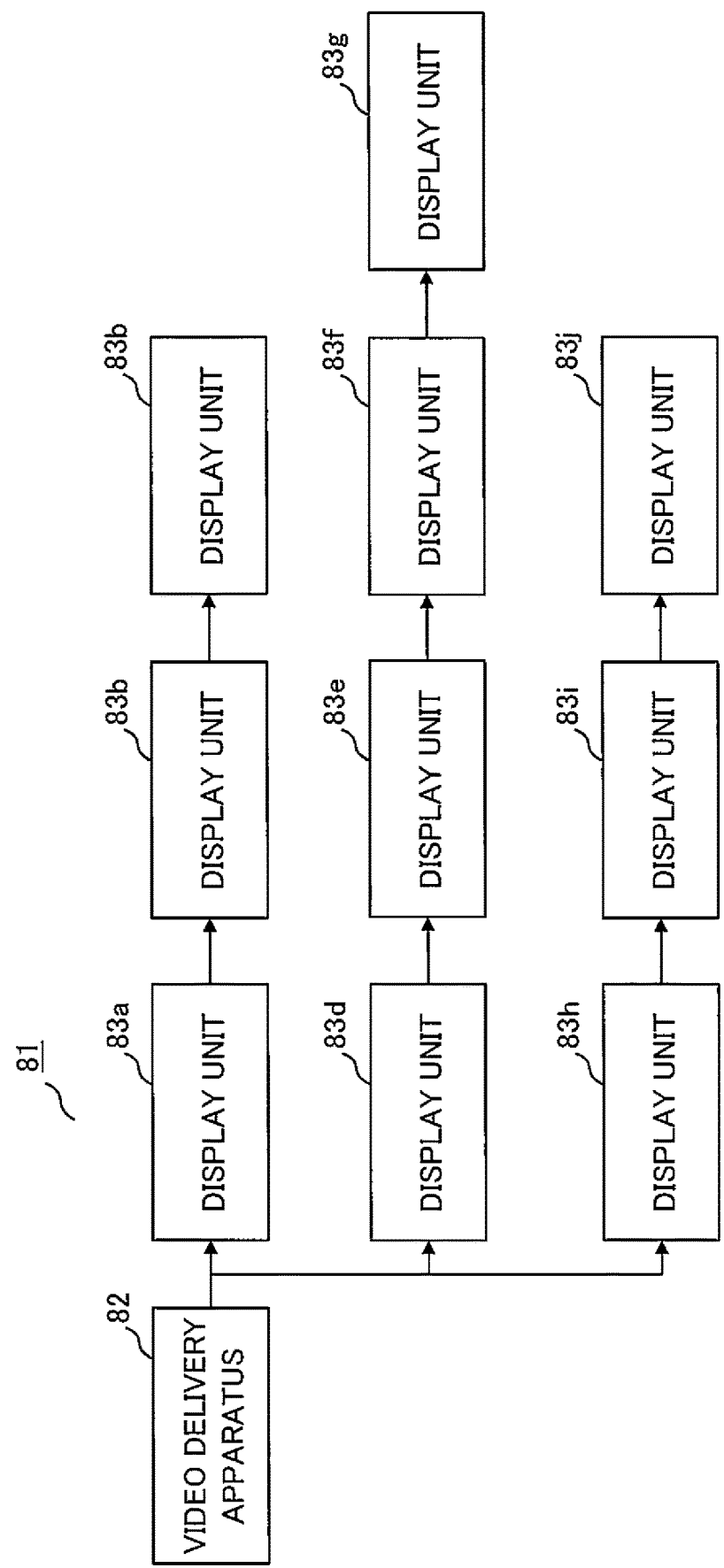

Fig.18

| ASPECT RATIO | SCREEN MODE | NUMBER OF PIXELS | |
|---|---|---|---|
| | | HORIZONTAL [pix] | VERTICAL [pix] |
| 5:4 | SXGA | 1280 | 1024 |
| | QSXGA | 2560 | 2048 |
| 4:3 | QVGA | 320 | 240 |
| | VGA | 640 | 480 |
| | PAL | 768 | 576 |
| | SVGA | 800 | 600 |
| | XGA | 1024 | 768 |
| | SXGA+ | 1400 | 1050 |
| | UXGA | 1600 | 1200 |
| | QXGA | 2048 | 1536 |
| 8:5 | CGA | 320 | 200 |
| | WXGA | 1280 | 800 |
| | WSXGA+ | 1680 | 1050 |
| | WUXGA | 1920 | 1200 |
| | WQXGA | 2560 | 1600 |
| 5:3 | WVGA | 800 | 480 |
| | WXGA | 1280 | 768 |
| 16:9 | FWVGA | 854 | 480 |
| | HD720 | 1280 | 720 |
| | HD1080 | 1920 | 1080 |

| ASPECT RATIO | SCREEN MODE | NUMBER OF PIXELS | | FACTORIZATION INTO PRIME FACTORS (VERTICAL) | | | |
|---|---|---|---|---|---|---|---|
| | | HORIZONTAL [pix] | VERTICAL [pix] | 2 | 3 | 5 | 7 |
| 5:4 | SXGA | 1280 | 1024 | 10 | 0 | 0 | 0 |
| | QSXGA | 2560 | 2048 | 11 | 0 | 0 | 0 |
| 4:3 | QVGA | 320 | 240 | 4 | 1 | 1 | 0 |
| | VGA | 640 | 480 | 5 | 1 | 1 | 0 |
| | PAL | 768 | 576 | 6 | 2 | 0 | 0 |
| | SVGA | 800 | 600 | 3 | 1 | 2 | 0 |
| | XGA | 1024 | 768 | 8 | 1 | 0 | 0 |
| | SXGA+ | 1400 | 1050 | 1 | 1 | 2 | 1 |
| | UXGA | 1600 | 1200 | 4 | 1 | 2 | 0 |
| | QXGA | 2048 | 1536 | 9 | 1 | 0 | 0 |
| 8:5 | CGA | 320 | 200 | 3 | 0 | 2 | 0 |
| | WXGA | 1280 | 800 | 5 | 0 | 2 | 0 |
| | WSXGA+ | 1680 | 1050 | 1 | 1 | 2 | 1 |
| | WUXGA | 1920 | 1200 | 4 | 1 | 2 | 0 |
| | WQXGA | 2560 | 1600 | 6 | 0 | 2 | 0 |
| 5:3 | WVGA | 800 | 480 | 5 | 1 | 1 | 0 |
| | WXGA | 1280 | 768 | 8 | 1 | 0 | 0 |
| 16:9 | FWVGA | 854 | 480 | 5 | 1 | 1 | 0 |
| | HD720 | 1280 | 720 | 4 | 2 | 1 | 0 |
| | HD1080 | 1920 | 1080 | 3 | 3 | 1 | 0 |

| DISPLAY MODULE | ID | MODE | ORIENTATION | RESOLUTION [pix × pix] | NUMBER OF COLORS DISPLAYED [bit] | FREQUENCY [Hz] |
|---|---|---|---|---|---|---|
| 91 | D6 | QXGA | LATERAL | 2048 × 1536 | 24 | 60 |
| 92 | D7 | SXGZ+ | LATERAL | 1400 × 1050 | 24 | 60 |

| NUMBER OF PATTERNS | PATTERN A | | PATTERN B | | PATTERN C | |
|---|---|---|---|---|---|---|
| | NUMBER OF OUTPUT LINES | NUMBER OF TIMES | NUMBER OF OUTPUT LINES | NUMBER OF TIMES | NUMBER OF OUTPUT LINES | NUMBER OF TIMES |
| 3 | 3 | 474 | 4 | 6 | 3 | 30 |
| | 2 | | 2 | | 3 | |

Fig.29

| DISPLAY MODULE | ID | MODE | ORIENTATION | RESOLUTION [pix × pix] | NUMBER OF COLORS DISPLAYED [bit] | FREQUENCY [Hz] | NUMBER OF OUTPUT LINES |
|---|---|---|---|---|---|---|---|
| 26a | D1 | WVGA | LATERAL | 800×480 | 24 | 30 | 1 |
| 27a | D2 | QVGA | LATERAL | 320×240 | 24 | 60 | 1 |
| 27b | D3 | QVGA | LATERAL | 320×240 | 24 | 60 | 1 |
| 27c | D4 | QVGA | LATERAL | 320×240 | 24 | 60 | 1 |
| 27d | D5 | QVGA | LATERAL | 320×240 | 24 | 60 | 1 |
| 26b | D6 | WVGA | LATERAL | 800×480 | 24 | 30 | 1 |

VIDEO DELIVERY APPARATUS, DISPLAY CONTROLLER, AND VIDEO DELIVERY SYSTEM

TECHNICAL FIELD

The present invention relates to a technique for delivering video information to multiple display modules constituting a display.

BACKGROUND ART

Various liquid crystal displays, organic EL (Electro Luminescence) displays, and inorganic EL displays are used as universal display devices in places such as inside and outside stations, factories, hospitals, and banks. With the increasing range of uses, the variety of displays is increasing. Besides, some types of displays are available at a reasonable price due to mass production.

On the one hand, important factors in using displays for industrial instruments are the continuing supply of devices and easy maintenance. If the model of a device is changed frequently or if a device is not supplied continuously, either redesign or exchange of devices is needed, which makes the cost expensive in the long run.

On the other hand, the volume of information intended to be displayed is increasing, and therefore there is a growing need for a larger screen.

When used as display units of a device, displays are sometimes called display modules to distinguish them from displays as products. In the case of an LCD (Liquid Crystal Display), for example, a display module includes: a panel that displays display data thereon; and a drive circuit that is configured to supply an electric signal to the panel. Various display modules are available on the market. Non Patent Literature 1 discloses a technique in which, when a commercially available display module is used as a display unit of a device, a display controller takes charge of smoothing out the difference in interface between the device and the display module so as to easily handle the need for redesign or exchange of display modules. The display controller stores display data input from the device in an internal or external memory, and input the display data into the display module according to the specifications of the display module (Non Patent Literature 1 below).

Meanwhile, Patent Literature 1 discloses a technique for increasing the size of a screen by using multiple display units corresponding to display modules. In Patent Literature 1, for each of multiple display units constituting a large screen, a video display apparatus retrieves data to be displayed on the display unit from display data for the entire large screen, and sends the display unit the display data with a location number for identifying the display unit (see Patent Literature 1 below).

CITATION LIST

Non Patent Literature

Non Patent Literature 1: "Collection of production with application of graphic display module" edited by Transistor Technology editorial department, CQ publishing firm, Oct. 15, 2012, pp. 178 and 179

Patent Literature

Patent Literature 1: JP2002-311932 A

SUMMARY OF INVENTION

Technical Problem

However, in Patent Literature 1, since the video display apparatus sends the display unit one screen's display data at a time, the display unit needs to be provided with a memory large enough to hold one display unit's data, and thus there is a problem that a larger memory is needed for a larger display unit. Note that, Non Patent Literature 1 discloses no method for reducing the size of a memory of a display controller.

The present invention has been made to solve the problem as described above, and aims to achieve a video delivery apparatus that reduces the size of a memory held by a display controller.

Solution to Problem

Included are:

a division unit to divide video information corresponding to one screen, which is to be delivered to each of a plurality of display modules constituting a display, into pieces of video information each corresponding to the number of output lines, which is N times (N is an integer of one or greater) a line indicating pixels per one line of the corresponding display module, and output the pieces of video information corresponding to the number of output lines for each of the plurality of display modules; and a delivery processor to deliver the video information corresponding to one screen of the display by repetitively delivering, to the plurality of display modules, delivery data obtained by multiplexing the pieces of video information corresponding to the number of output lines of the respective plurality of display modules, output from the division unit, and control information indicating the target display modules to which the pieces of video information corresponding to the number of output lines are to be delivered respectively.

Included are the steps of:

dividing video information corresponding to one screen, which is to be delivered to each of a plurality of display modules constituting a display, into pieces of video information each corresponding to the number of output lines, which is N times (N is an integer of one or greater) a line indicating pixels per one line of the corresponding display module;

outputting the pieces of video information corresponding to the number of output lines for each of the plurality of display modules; and delivering the video information corresponding to one screen of the display by repetitively delivering, to the plurality of display modules, delivery data obtained by multiplexing the pieces of video information corresponding to the number of output lines of the respective plurality of display modules and control information indicating the target display modules to which the pieces of video information corresponding to the number of output lines are to be delivered respectively.

Included are:

a video information reception processor to retrieve, from delivery data addressed to a plurality of display modules, constituting a display, obtained by multiplexing pieces of video information each corresponding to N times (N is an integer of one or greater) a line indicating pixels per one line of the corresponding display module, video information addressed to a display module connected to a subject device the display controller belongs to and output the retrieved video information;

an adjustment unit to adjust the speed of the video information for the display module, input from the video information reception processor, to a speed suited to the display module and output the adjusted video information;

a display module interface unit to convert the video information for the display module, input from the adjustment unit, into a signal suited to an interface of the display module and output the signal obtained by the conversion to the display module; and a video information sending processor to receive the delivery data from the video information reception processor and deliver the delivery data to a different display module again.

Included are the steps of:

retrieving, from delivery data addressed to a plurality of display modules, constituting a display, obtained by multiplexing pieces of video information each corresponding to N times (N is an integer of one or greater) a line indicating pixels per one line of the corresponding display module, video information addressed to each of the display modules;

outputting the retrieved video information;

adjusting the speed of the video information for the display module to a speed suited to the display module and then outputting the adjusted video information;

converting the video information for the display module into a signal suited to an interface of the display module and then outputting the signal obtained by the conversion to the display module; and delivering the delivery data to a different display module again.

Included are:

a video delivery apparatus that includes a division unit to divide video information corresponding to one screen, which is to be delivered to each of a plurality of display modules constituting a display, into pieces of video information each corresponding to the number of output lines, which is N times (N is an integer of one or greater) a line indicating pixels per one line of the corresponding display module, and output the pieces of video information corresponding to the number of output lines for each of the plurality of display modules, and a delivery processor to deliver the video information corresponding to one screen of the display by repetitively delivering, to the plurality of display modules, delivery data obtained by multiplexing the pieces of video information corresponding to the number of output lines of the respective plurality of display modules, output from the division unit, and control information indicating the target display modules to which the pieces of video information corresponding to the number of output lines are to be delivered respectively; and a display controller that includes a video information reception processor to retrieve, from the delivery data, video information addressed to the display module connected to a subject device the display controller belongs to and output the retrieved video information, an adjustment unit to adjust the speed of the video information for the display module connected to the subject device, which is input from the video information reception processor, to a speed suited to the display module connected to the subject device and output the adjusted video information, a display module interface unit to convert the video information for the display module connected to the subject device, which is input from the adjustment unit, into a signal suited to an interface of the display module connected to the subject device and output the signal obtained by the conversion to the display module connected to the subject device, and a video information sending processor to receive the delivery data from the video information reception processor and deliver the delivery data to a different display module again.

Advantageous Effects of Invention

According to the invention, it is possible to reduce the size of a memory held by a display controller.

BRIEF DESCRIPTION OF DRAWINGS

FIG. 9 is a schematic diagram illustrating an example of display module setting information held by a setting unit according to the embodiment 1.

FIG. 17 is a block diagram illustrating an exemplary configuration of the video delivery system according to the embodiment 1.

FIG. 18 is a schematic diagram of a table that illustrates the specifications of screen modes according to the embodiment 1.

FIG. 19 is a schematic diagram of a table that illustrates the specifications of screen modes according to an embodiment 2.

FIG. 26 is a schematic diagram illustrating an example of display module setting information held by a setting unit according to the embodiment 2.

FIG. 29 is a schematic diagram illustrating an example of display module setting information held by a setting unit according to an embodiment 3.

DESCRIPTION OF EMBODIMENTS

Figure 1:
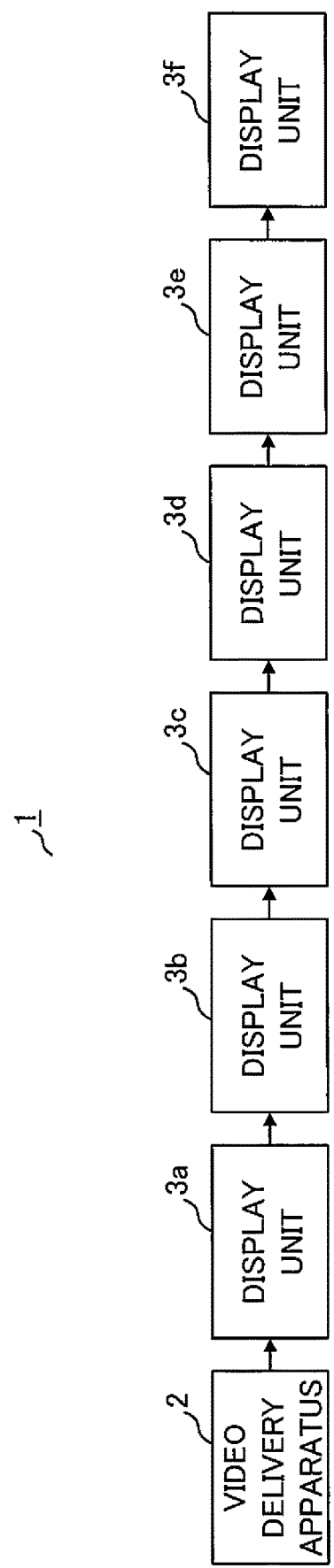
FIG. 1 is a block diagram illustrating an exemplary configuration of a video delivery system according to an embodiment 1.

Hereinbelow, embodiments of this invention will be described with reference to the drawings. Note that, parts that are the same or equivalent between the referenced drawings are given the same reference numerals.

Embodiment 1

This embodiment exemplifies a case of implementing a concave display by combining multiple different display modules with each other.

FIG. 1 is a block diagram illustrating an exemplary configuration of a video delivery system 1 according to the embodiment 1. The video delivery system 1 is equipped with a video delivery apparatus 2 and display units 3a to 3f. The video delivery apparatus 2 delivers video information to the display units 3a to 3f.

Figure 2:
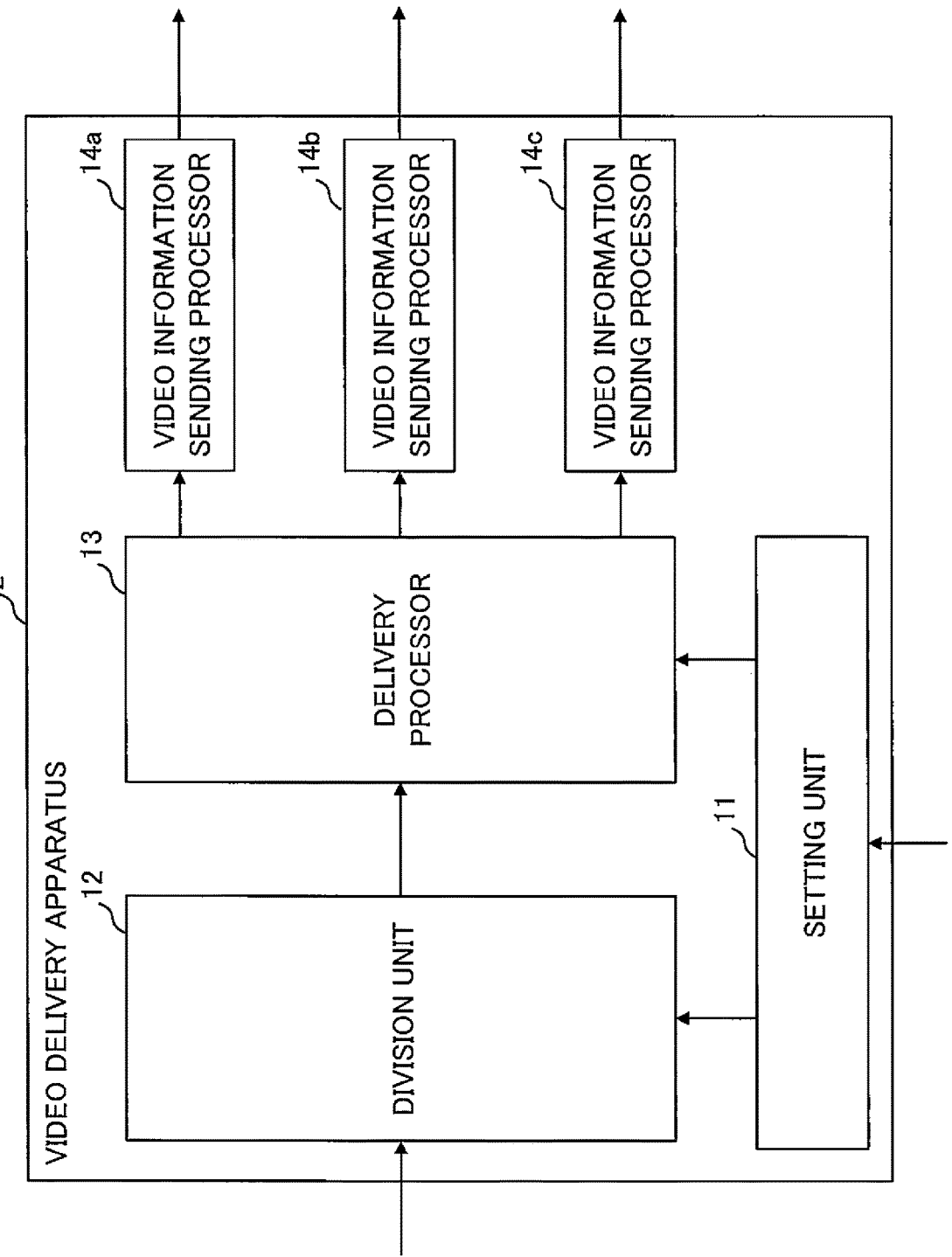
FIG. 2 is a block diagram illustrating an exemplary functional configuration of a video delivery apparatus according to the embodiment 1.

FIG. 2 is a block diagram illustrating an exemplary functional configuration of the video delivery apparatus 2 according to the embodiment 1. The video delivery apparatus 2 includes: a setting unit 11; a division unit 12; a delivery processor 13; and video information sending processors 14a to 14c. The video delivery apparatus 2 includes the three video information sending processors 14a to 14c according to the physical number of connectors to be connected to the display units. As illustrated in the video delivery system 1 of FIG. 1, the display units 3a to 3f are connected to each other in a row, and the display unit 3a is connected to the video information sending processor 14a. The video information sending processors 14b and 14c execute no processing because they are not connected to any display unit. The number of video information sending processors 14b and 14c included in the video delivery apparatus 2 is determined depending on the physical number of connectors to be connected to the display units.

The setting unit 11 holds setting information and layout information of display modules equipped in the respective display units 3a to 3f. The display module setting information and layout information will be described later. The division unit 12 is configured to divide input video information based on the display module setting information, and output, to the delivery processor 13, pieces of video information to be delivered to the respective display units 3a to 3f per one control cycle. The delivery processor 13 outputs, to the video information sending processor 14a, delivery data obtained by multiplexing the pieces of video information to be delivered to the respective display units 3a to 3f per one control cycle based on the display module layout information. The video information sending processor 14a is configured to execute signal processing on the delivery data to convert it into a sending signal, and send the sending signal to the display units 3a to 3f. One control cycle denotes a period needed to deliver one delivery data obtained by multiplexing pieces of video information to be delivered to the respective multiple display units. The length of time of one control cycle varies depending on the size of the delivery data. These functional units will be described in detail later.

Figure 3:
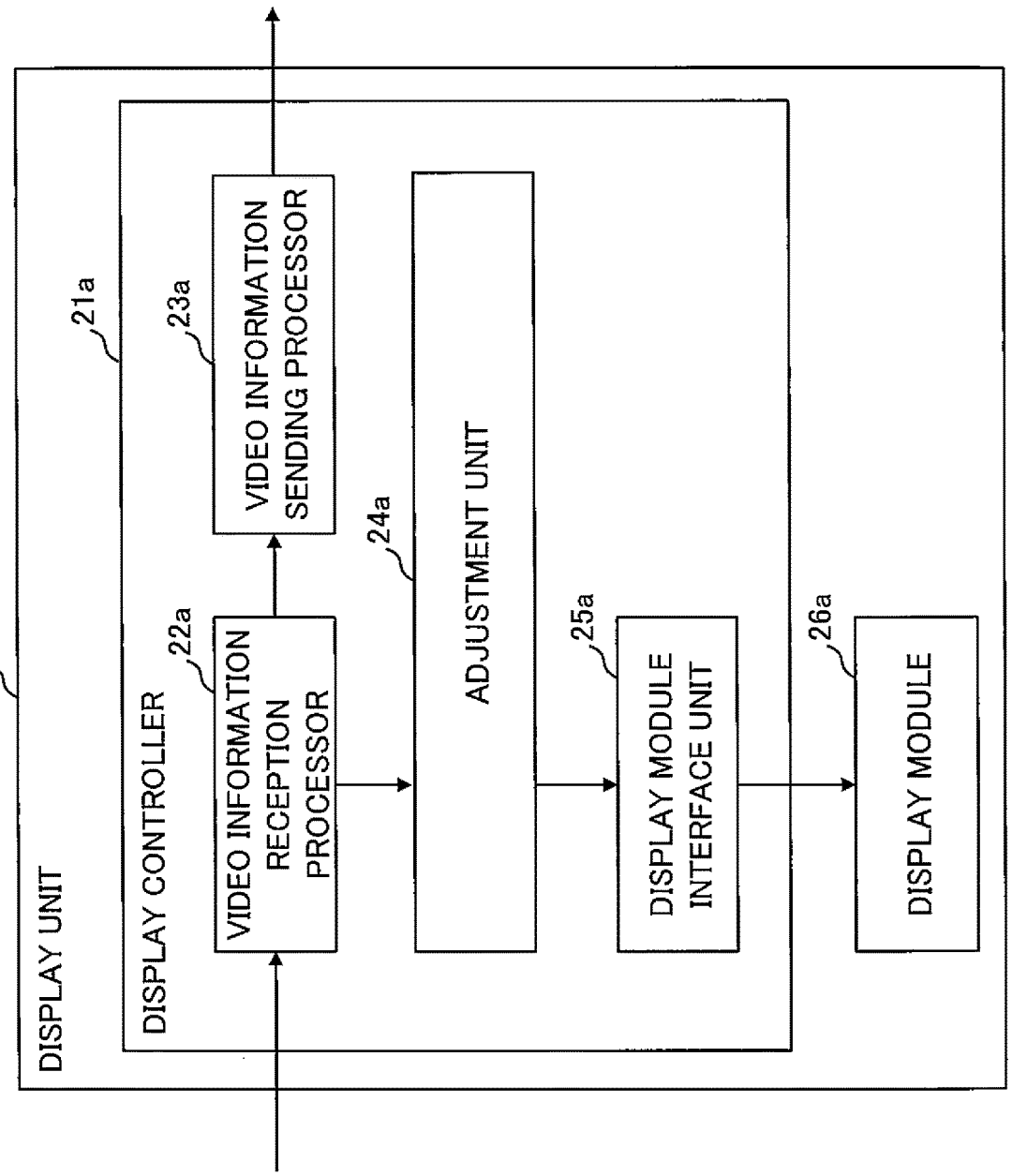
FIG. 3 is a block diagram illustrating an exemplary functional configuration of a display unit according to the embodiment 1.

FIG. 3 is a block diagram illustrating an exemplary functional configuration of the display unit 3a according to the embodiment 1. The display unit 3a is equipped with a display controller 21a and a display module 26a. The display controller 21a includes: a video information reception processor 22a; a video information sending processor 23a; an adjustment unit 24a; and a display module interface unit 25a. Although the display unit 3f has the same configuration as the display unit 3a, its display module is assigned reference numeral 26b.

The video information reception processor 22a is configured to receive a sending signal sent from the video delivery apparatus 2, execute signal processing on the sending signal, and thereby output, to the video information sending processor 23a and the adjustment unit 24a, delivery data obtained by multiplexing the pieces of video information for one control cycle. The video information sending processor 23a is configured to execute signal processing on the delivery data to convert it into a sending signal, and send the sending signal to the display unit 3b adjacent thereto. The adjustment unit 24a is configured to retrieve, from the delivery data, video information addressed to the display module 26a, adjust the speed of the video information thus retrieved, and output the adjusted video information to the display module interface unit 25a. The display module interface unit 25a is configured to convert the video information, input from the adjustment unit 24a, into a video signal that is compliant with the specifications of the display module 26a, and output the video signal to the display module 26a. These functional units will be described in detail later.

Figure 4:
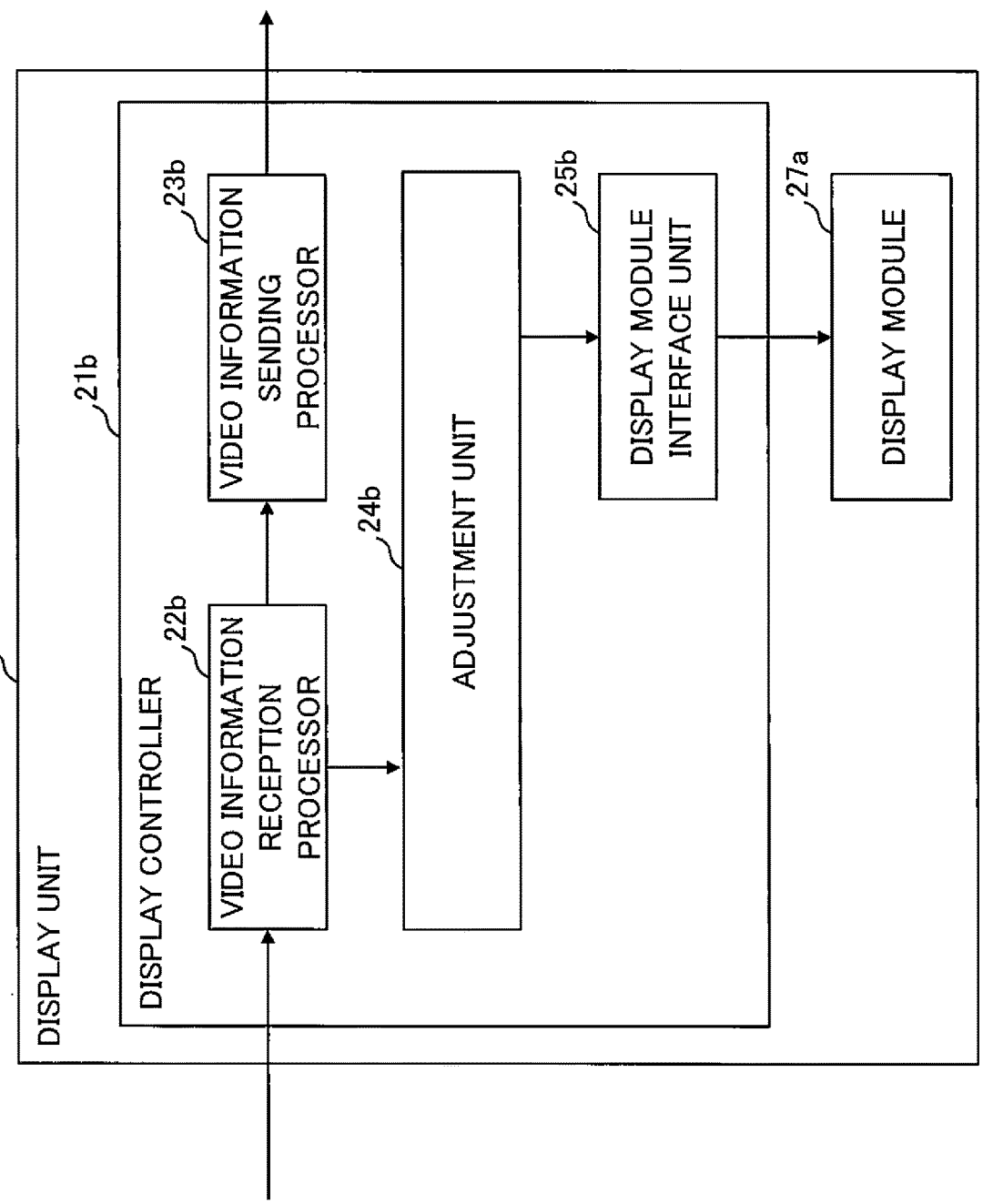
FIG. 4 is a block diagram illustrating an exemplary functional configuration of a display unit according to the embodiment 1.

FIG. 4 is a block diagram illustrating an exemplary functional configuration of the display unit 3b according to the embodiment 1. The display unit 3b is equipped with a display controller 21b and a display module 27a. The display controller 21b includes: a video information reception processor 22b; a video information sending processor 23b; an adjustment unit 24b; and a display module interface unit 25b. The display unit 3b has the same configuration as the display unit 3a. Although the display units 3c to 3e each have the same configuration as the display unit 3b, their display modules are assigned reference numerals 27b to 27d.

The display modules 26a and 26b and 27a to 27d each include: a panel; and a drive circuit configured to supply an electric signal to the panel. Each panel displays thereon input video information.

Figure 5:
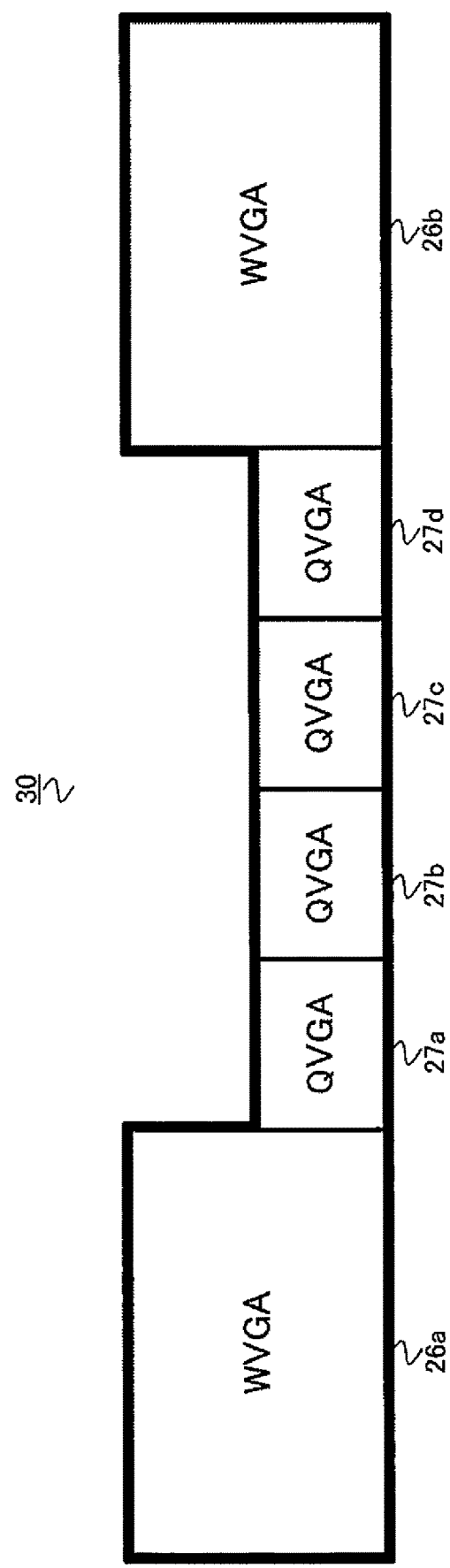
FIG. 5 is a schematic diagram illustrating an example of a display constituted of display modules according to the embodiment 1.

FIG. 5 is a schematic diagram illustrating an example of a display 30 constituted of the display modules 26a and 26b and 27a to 27d according to the embodiment 1. The display 30 is a concave display constituted of the display modules 26a and 26b and 27a to 27d. The display mode of each of the display modules 26a and 26b is WVGA (Wide Video Graphics Array). The display mode of each of the display modules 27a to 27d is QVGA (Quarter Video Graphics Array). In the display 30, the display modules are laid out in the order of the display module 26a, 27a to 27d, and the display module 26b.

Figure 6A:
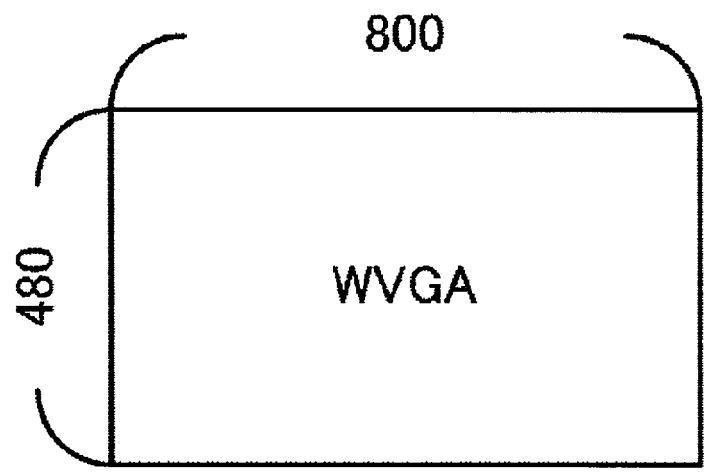
FIG. 6A is a schematic diagram illustrating the number of pixels of WVGA QVGA according to the embodiment 1.
Figure 6B:
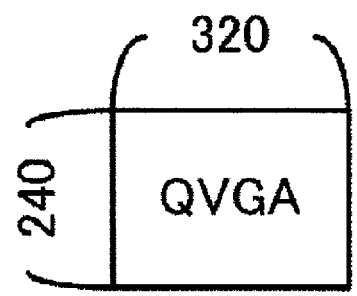
FIG. 6B is a schematic diagram illustrating the number of pixels of QVGA according to the embodiment 1.

FIG. 6A and FIG. 6B are schematic diagrams each illustrating the number of pixels of each of WVGA and QVGA according to the embodiment 1. FIG. 6A is a schematic diagram illustrating the number of pixels of WVGA, and FIG. 6B is a schematic diagram illustrating the number of pixels of QVGA. WVGA has 800 pixels in width×480 pixels in height, while QVGA has 320 pixels in width×240 pixels in height.

Figure 7:
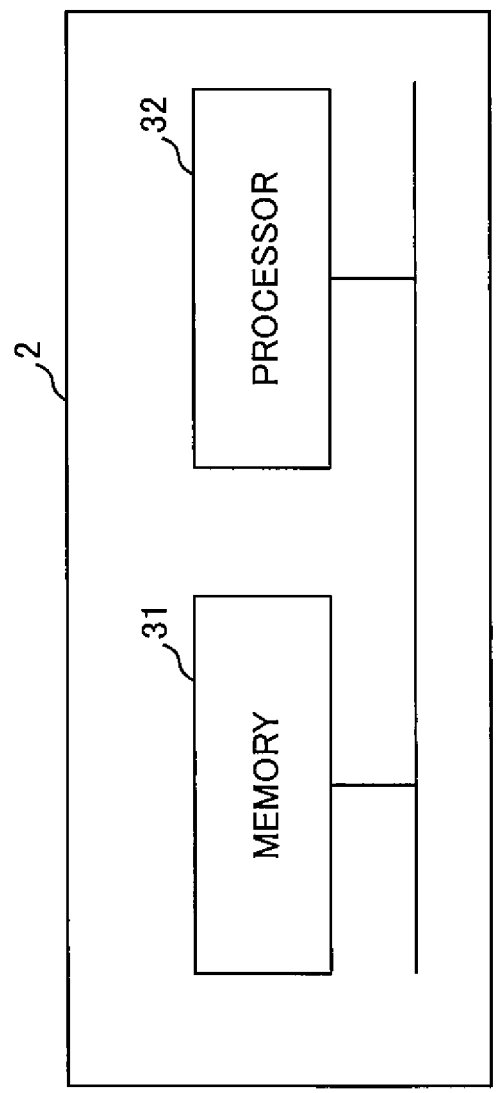
FIG. 7 is a block diagram illustrating an exemplary hardware configuration of the video delivery apparatus according to the embodiment 1.

FIG. 7 is a block diagram illustrating an exemplary hardware configuration of the video delivery apparatus 2 according to the embodiment 1. The video delivery apparatus 2 is equipped with: a memory 31; a processor 32; and a communication interface 33.

The memory 31 stores therein programs and data for implementing the functions of the setting unit 11, the division unit 12, the delivery processor 13, and the video information sending processors 14a to 14c. The memory 31 is constituted of a ROM (Read Only Memory), a RAM (Random Access Memory), an HDD (Hard Disk Drive), or an SSD (Solid State Drive), for example.

The processor 32 is configured to retrieve the programs and data stored in the memory 31 to implement the functions of the setting unit 11, the division unit 12, the delivery processor 13, and the video information sending processors 14a to 14c. The processor 32 is implemented by a processing circuit such as a CPU and a system LSI (Large Scale Integration) for executing the programs stored in the memory 31.

Note that multiple processing circuits may be used in combination to implement the functions of the setting unit 11, the division unit 12, the delivery processor 13, and the video information sending processors 14a to 14c.

The communication interface 33 implements the functions of the video information sending processors 14a to 14c.

Figure 8:
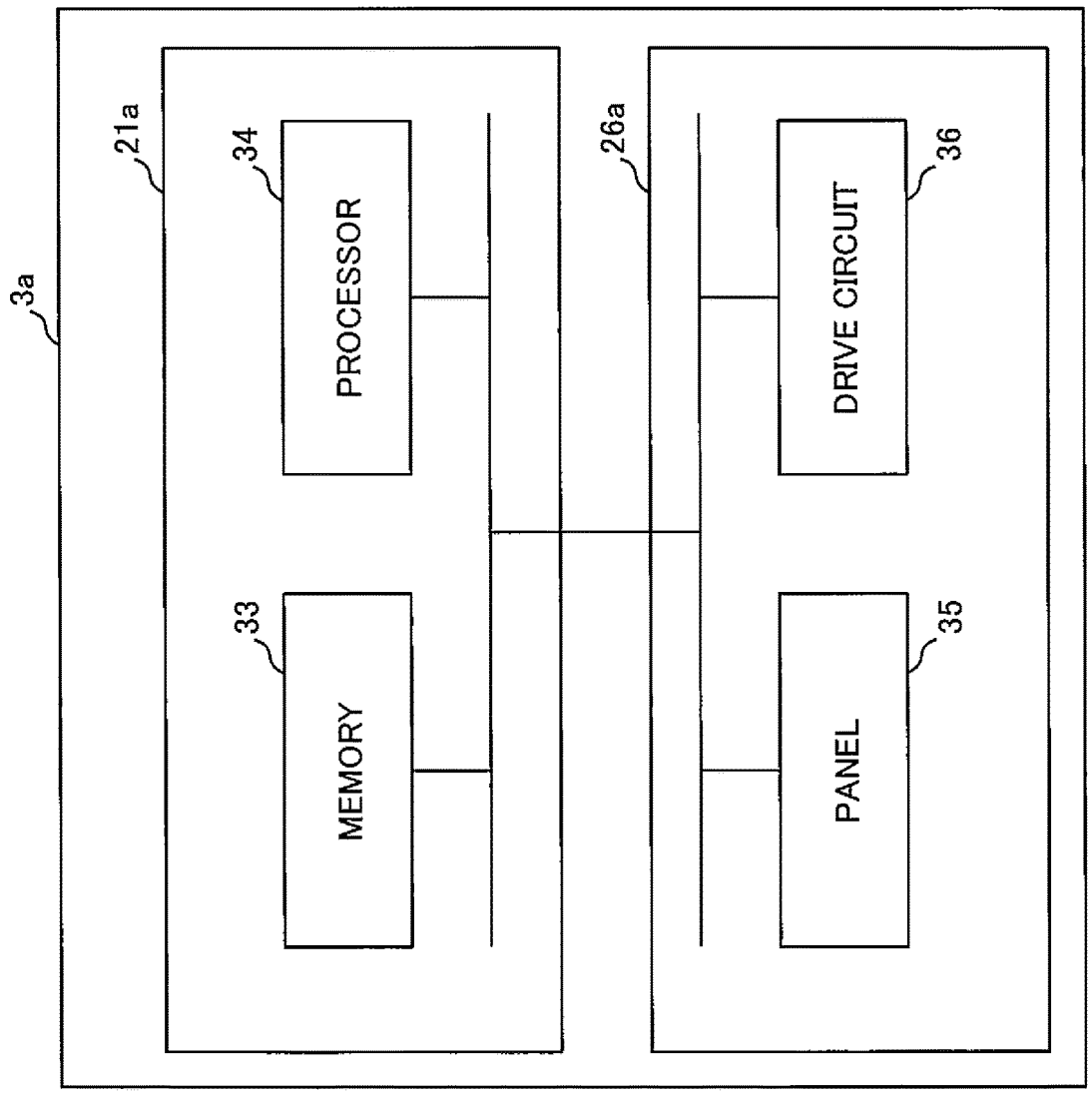
FIG. 8 is a block diagram illustrating exemplary hardware configurations of a display controller and the display module of the display unit according to the embodiment 1.

FIG. 8 is a block diagram illustrating exemplary hardware configurations of the display controller 21a and the display module 26a of the display unit 3a according to the embodiment 1. The display controller 21a is equipped with a memory 33 and a processor 34. The display module 26a is equipped with a panel 35 and a drive circuit 36.

The memory 33 stores therein programs and data for implementing the functions of the video information reception processor 22a, the video information sending processor 23a, the adjustment unit 24a, and the display module interface unit 25a. The memory 33 is constituted of a ROM (Read Only Memory), a RAM (Random Access Memory), an HDD (Hard Disk Drive), or an SSD (Solid State Drive), for example.

The processor 34 is configured to retrieve the programs and data stored in the memory 33 to implement the functions of the video information reception processor 22a, the video information sending processor 23a, the adjustment unit 24a, and the display module interface unit 25a. The processor 34 is implemented by a processing circuit such as a CPU and a system LSI (Large Scale Integration) for executing the programs stored in the memory 33.

Note that multiple processing circuits may be used in combination to implement the functions of the video information reception processor 22a, the video information sending processor 23a, the adjustment unit 24a, and the display module interface unit 25a. In addition, the display controller 21a may use an FPGA (Field-Programmable Gate Array) to implement the functions of the video information reception processor 22a, the video information sending processor 23a, the adjustment unit 24a, and the display module interface unit 25a.

The drive circuit 38 of the display module 26a is configured to output an electric signal, output from the display controller 21a, to the panel 37, and the panel 37 displays video information thereon in response to an instruction from the electric signal.

The display units 3b to 3f each have the same hardware configuration as the display unit 3a.

Next, the operation of the video delivery apparatus 2 is described.

FIG. 9 is a schematic diagram illustrating an example of display module setting information 41 held by the setting unit 11 according to the embodiment 1. In the display module setting information 41, the ID of each display module is associated with its mode, screen orientation, resolution, number of colors displayed, frequency, and number of output lines. A line indicates a unit formed of multiple pixels constituting one line of the display module. A frequency indicates a refresh rate. The number of output lines indicates the number of lines to be output per one control cycle. The number of output lines takes an integer N of one or greater. The setting information 41 shows that, per one control cycle, the video delivery apparatus 2 sends video information corresponding to two lines' video information to the display modules 26a and 26b and sends one line's video information to the display modules 27a to 27d.

WVGA and QVGA both have the number of display colors of 24 bit and both have a frequency of 60 Hz. Thus, the volume of video information per one control cycle to be sent from the video delivery apparatus 2 to the display modules 26a and 26b and to the display modules 27a to 27d is determined based on the ratio of the number of lines. Since all the display modules 26a and 26b and 27a to 27d are laid laterally, the number of lines of each of the display modules 26a and 26b is 480 while the number of lines of each of the display modules 27a to 27d is 240. Because the ratio of the number of lines between WVGA and QVGA is 2:1, the number of output lines for the display modules 26a and 26b is set at two and the number of output lines for the display modules 27a to 27d is set at one. The number of output lines in the setting information 41 is set by a user in advance.

The setting unit 11 also holds information on the number of display units connected to the video delivery apparatus 2, the number of display modules, and the layout of the display modules. The number of display units is six, and the number of display modules is six. The display module layout information indicates information showing that the display modules 26a and 26b and 27a to 27d are laid out in the ascending order of distance to the video delivery apparatus 2: 26a, 27a, 27b, 27c, 27d, and 26b.

Figure 10:
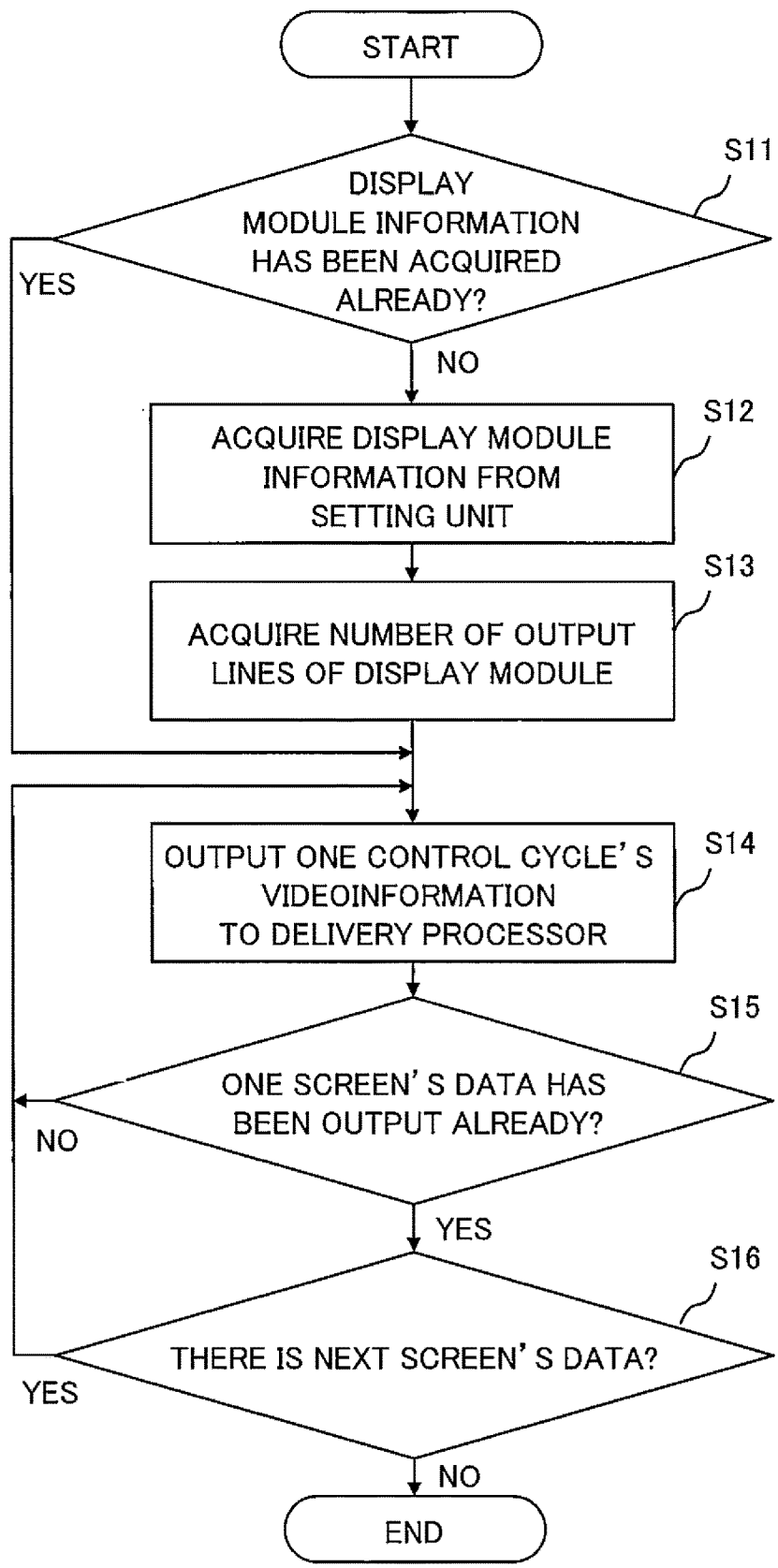
FIG. 10 is a flowchart illustrating processing executed by a division unit according to the embodiment 1.

FIG. 10 is a flowchart illustrating processing executed by the division unit 12 according to the embodiment 1. Video information to be displayed on the display modules 26a and 26b and 27a to 27d is input to the division unit 12 together with the IDs of the display modules 26a and 26b and 27a to 27d. The division unit 12 stores the input video information in the memory and processes the video information one screen information at a time. Upon input of the video information, the division unit 12 starts processing from Step S11.

In Step S11, the division unit 12 judges whether display module information has been acquired already. If it has not been acquired yet, the process proceeds to Step S12. If it has been acquired already, the process proceeds to Step S14.

In Step S12, the division unit 12 acquires, from the setting unit 11, the information on the number of display units, the number of display modules and the layout of the display modules and the setting information 41 of the display modules 26a and 26b and 27a to 27d. The display module layout information indicates information showing, using the order of the IDs of the display modules 26a and 26b and 27a to 27d, that the display modules 26a and 26b and 27a to 27d are laid out in the ascending order of distance to the video delivery apparatus 2: 26a, 27a, 27b, 27c, 27d, and 26b.

In Step S13, the division unit 12 acquires the number of output lines of each of the display modules 26a and 26b and 27a to 27d from the setting information 41.

In Step S14, out of the input video information, the division unit 12 outputs video information, corresponding to the number of output lines of each of the target display modules, to the delivery processor 13 in association with the ID of the display module. The video information corresponding to the number of output lines has a data volume N times (N is an integer of one or greater) that of one line. To the delivery processor 13, the division unit 12 outputs, per one control cycle, two lines' video information for the display modules 26a and 26b and one line's video information for the display modules 27a to 27d.

Figure 11:
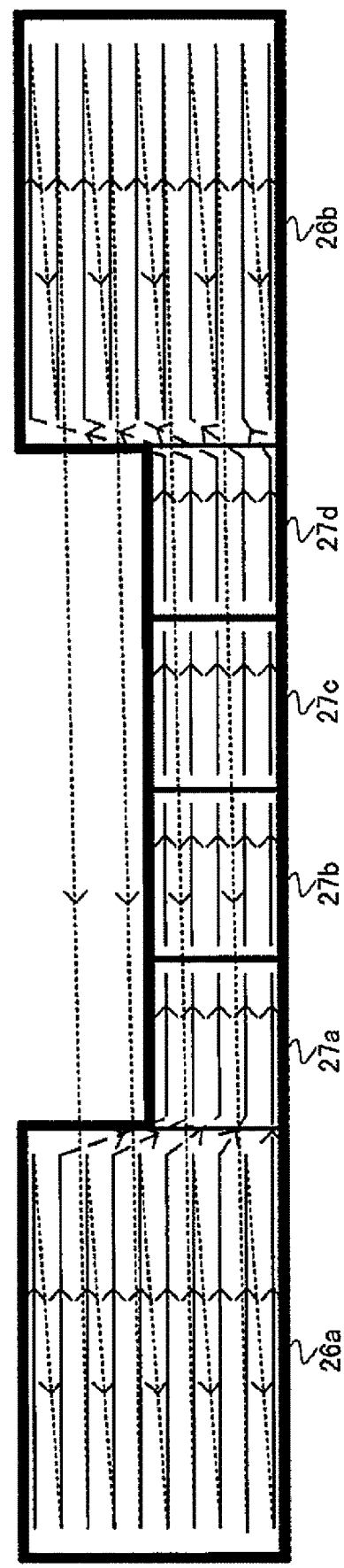
FIG. 11 is a schematic diagram illustrating the order of delivery of video information to the display modules according to the embodiment 1.

FIG. 11 is a schematic diagram illustrating the order of delivery of video information to the display modules 26a and 26b and 27a to 27d according to the embodiment 1. The delivery processor 13 delivers two lines' video information for the display module 26a, one line's video information for the display module 27a, one line's video information for the display module 27b, one line's video information for the display module 27c, one line's video information for the display module 27d, and two lines' video information for the display module 26b in this order. As illustrated in FIG. 11, the delivery processor 13 delivers video information to the display modules 26a and 26b and 27a to 27d time and time again.

The flowchart of the division unit 12 in FIG. 10 is described again.

In Step S15, the division unit 12 judges whether video information corresponding to one screen's video information has been output already. If one screen's video information has not been output yet, the process proceeds to Step S14. The division unit 12 repeats processing of Steps S14 and S15 until the delivery of one screen's video information of the display modules 26a and 26b and 27a to 27d is over. If one screen's video information has been output already, the process proceeds to Step S16.

In Step S16, the division unit 12 judges whether there is next screen's video information. If there is next screen's video information, the process proceeds to Step S14. If there is no next screen's video information, the process terminates.

Figure 12:
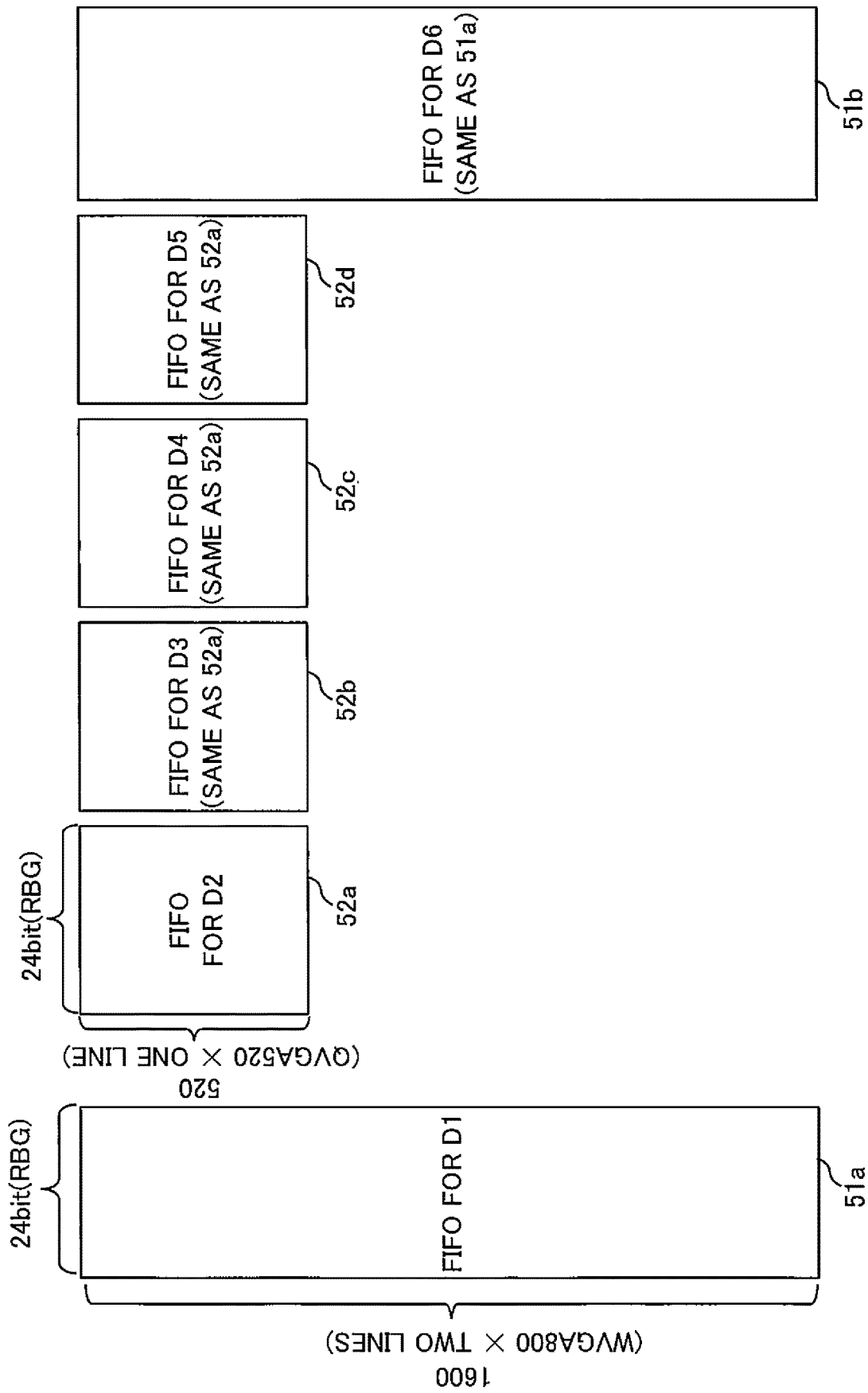
FIG. 12 is a schematic diagram illustrating an example of queues held by a delivery processor according to the embodiment 1.

FIG. 12 is a schematic diagram illustrating an example of queues 51a and 51b and 52a to 52d held by the delivery processor 13 according to the embodiment 1. The delivery processor 13 holds six queues according to the layout information of the display modules 26a and 26b and 27a to 27d. The queues 51a and 51b and 52a to 52d are FIFO (First In First Out) queues. The queues 51a and 51b and 52a to 52d can hold one control cycle's video information.

The queue 51a is a FIFO queue for the display module 26a. In order to send two lines' video information to the display module 26a per one control cycle, the queue 51a can hold data of 800 pixels×2 lines×24 bits. The queue 51b is a FIFO queue for the display module 26b, and can hold the same amount of data as the queue 51a.

The queue 52a is a FIFO queue for the display module 27a. In order to send one line's video information to the display module 27a per one control cycle, the queue 51a can hold data of 520 pixels×1 line×24 bits. The queues 52b to 52d are FIFO queues for the respective display modules 27b to 27d, and can each hold the same amount of data as the queue 52a.

The delivery processor 13 generates delivery data by multiplexing pieces of video information addressed to the respective display modules sequentially in the ascending order of distance to the video delivery apparatus 2. From the layout information of the display modules 26a and 26b and 27a to 27d, the delivery processor 13 knows that the display modules 26a and 26b and 27a to 27d are laid out in the ascending order of distance to the video delivery apparatus 2: the display modules 26a, 27a, 27b, 27c, 27d, and 26b. The delivery processor 13 retrieves video information sequentially from the queues 51a, 52a, 52b, 52c, 52d, and 51b that correspond respectively to the display modules 26a, 27a, 27b, 27c, 27d, and 26b, and generates multiplexed delivery data from the retrieved video information sequentially. In addition, the delivery processor 13 multiplexes the ID, line number, and screen synchronization signal of each of the target display modules into the delivery data as control information. The delivery processor 13 outputs the generated delivery data to the video information sending processor 14*a*.

The video information sending processor 14*a* executes signal processing on the delivery data to convert it into a sending signal, and then sends the sending signal to the display unit 3*a*. For the signal processing, the video information sending processor 14*a* executes encryption of the delivery data, error-correcting coding processing, conversion processing suited to the protocol of the physical layer, and conversion processing according to the serial transfer method 8*b*/10*b*. The video information sending processor 14*a* outputs the sending signal according to a physical medium. Assume that the physical layer protocol is Ethernet (registered trademark) and the physical medium is an optical cable.

Next, the operation of the display unit 3*a* is described.

The video information reception processor 22*a* receives a sending signal sent from the video information sending processor 14*a* of the video delivery apparatus 2, and executes conversion processing suited to 8*b*/10*b*, conversion processing suited to Ethernet (registered trademark), error-correcting coding processing, and code decryption processing to retrieve delivery data including control information and video information. The video information reception processor 22*a* refers to the control information of the delivery data and, if there is any video information addressed to the display module 26*a* of this display unit, outputs the video information for the display module 26*a* and the control information to the adjustment unit 24*a*. In addition, the video information reception processor 22*a* outputs the received delivery data to the video information sending processor 23*a*. For the signal processing, the video information sending processor 23*a* executes encryption of sending data, error-correcting coding processing, conversion processing suited to the protocol of the physical layer, and conversion processing according to the serial transfer method 8*b*/10*b* to convert the delivery data into a sending signal. The video information sending processor 23*a* sends the sending signal to the display unit 3*b*. If the delivery data has a large volume, the video information reception processor 22*a* needs a large memory for receiving the delivery data.

Like the display unit 3*a*, each of the display units 3*b* to 3*f* retrieves video information addressed to the display module of this display unit if any, and transfers the delivery data to the neighboring display unit.

Figure 13:
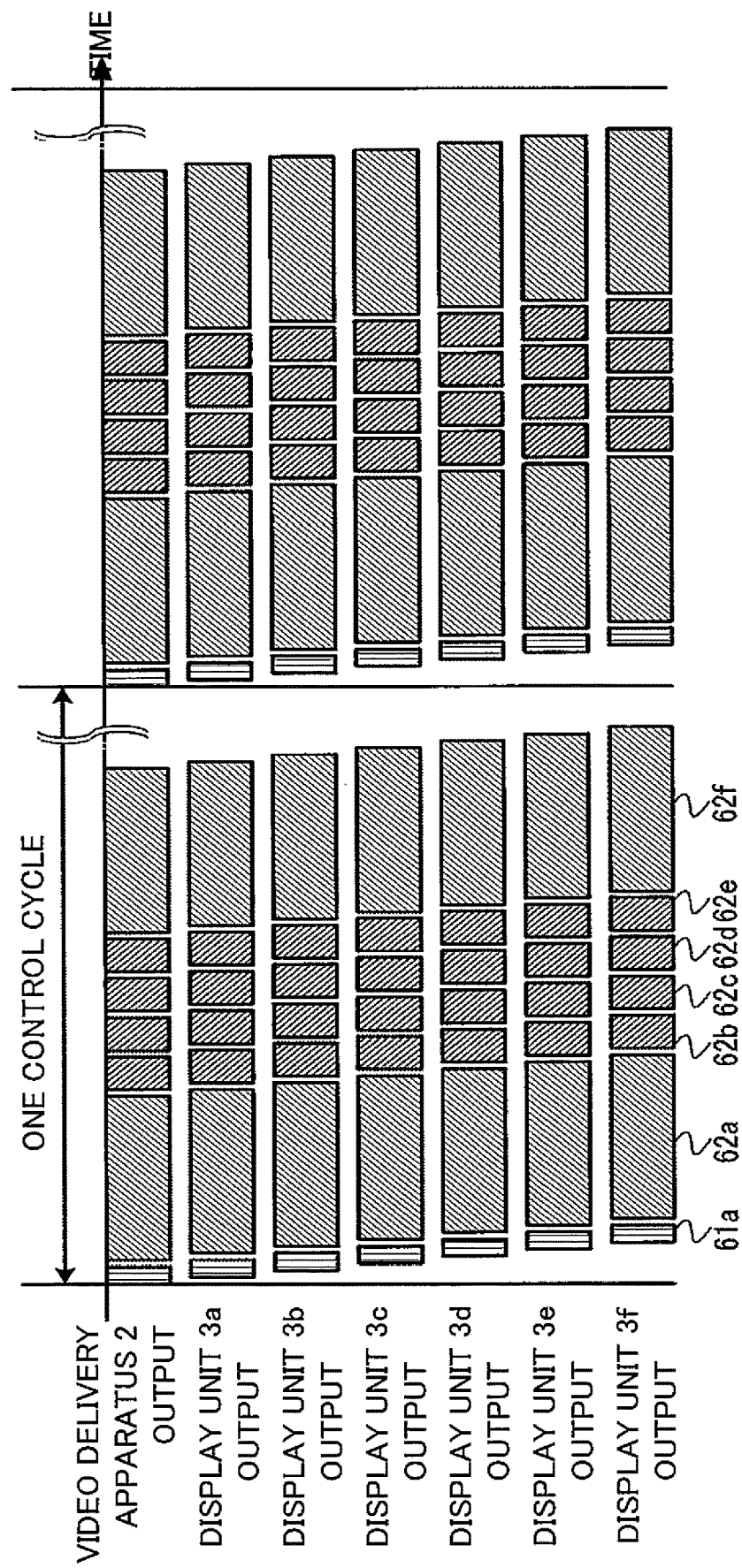
FIG. 13 is a schematic diagram illustrating delivery data output from the video delivery apparatus and the display units according to the embodiment 1.

FIG. 13 is a schematic diagram illustrating delivery data output from the video delivery apparatus 2 and the display units 3*a* to 3*f* according to the embodiment 1. Reference numeral 61*a* indicates control information. Reference numerals 62*a* to 62*f* indicate video information. The video information 62*a* is addressed to the display module 26*a*, the video information 62*b* is addressed to the display module 27*a*, the video information 62*c* is addressed to the display module 27*b*, the video information 62*d* is addressed to the display module 27*c*, the video information 62*e* is addressed to the display module 27*d*, and the video information 62*f* is addressed to the display module 26*b*. The delivery data is transferred to the neighboring display unit sequentially, like from the video delivery apparatus 2 to the display unit 3*a* and from the display unit 3*a* to the display unit 3*b*, to be transferred to the display unit 3*f*.

Figure 14:
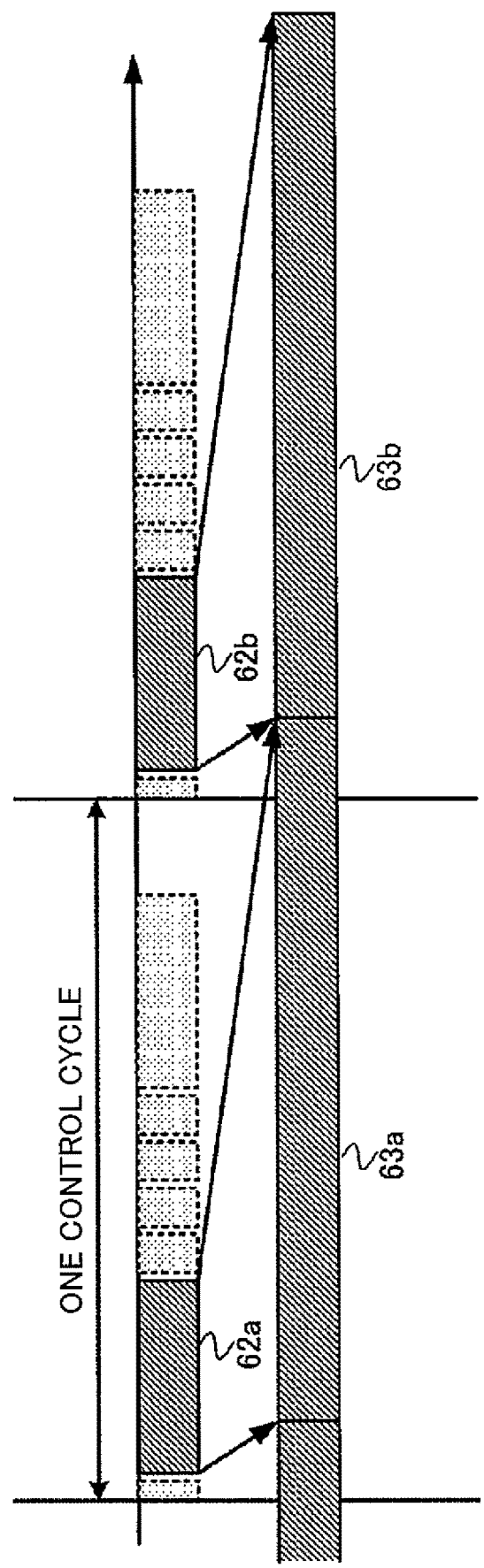
FIG. 14 is a schematic diagram illustrating processing of adjusting video information speed executed by an adjustment unit according to the embodiment 1.

FIG. 14 is a schematic diagram illustrating processing of adjusting the speed of the video information 62*a* executed by the adjustment unit 24*a* according to the embodiment 1. The video information 62*a* and 62*b* addressed to the display module 26*a* are a part of delivery data delivered to the video information reception processor 22*a* from the video delivery apparatus 2, and the video information 62*a* and the video information 62*b* for the display module 26*a* in the next control cycle are not consecutive data. Because the data needs to be input to the display module 26*a* as a consecutive signal, the adjustment unit 24*a* extends the video information for the display module 26*a* to convert it into consecutive data 63*a* and 63*b*. The adjustment unit 24*a* outputs the data 63*a* and 63*b* to the display module interface unit 25*a*.

The display module interface unit 25*a* converts the consecutive data 63*a* and 63*b* addressed to the display module 26*a* into a video signal defined for the display module 26*a*, and outputs the video signal to the display module 26*a*. Whether RGB should be input as 24-bit bus signal input or as high-speed serial signal input, for example, is defined depending on the type of display module. Further, it is defined at which phase a synchronization control signal such as a VSYNC signal and HSYNC signal is input to the video signal, for example.

Besides the display 30 of FIG. 5 illustrated as an example of a display constituted of multiple display modules, other examples of displays are provided.

Figure 15A:
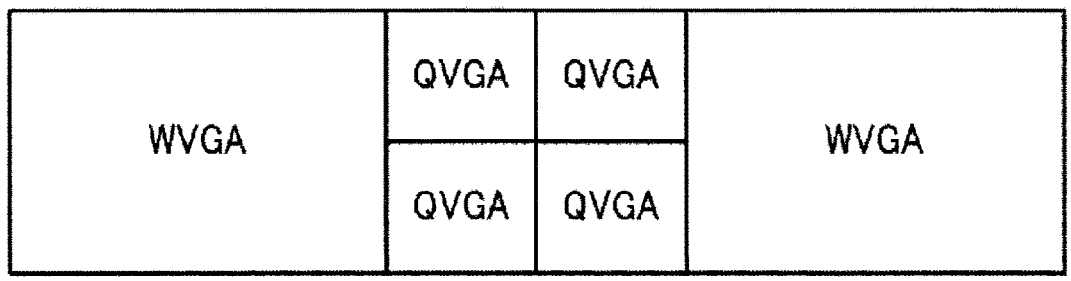
FIG. 15A illustrates a horizontally long display constituted of two WVGAs and four QVGAs according to the embodiment 1.
Figure 15B:
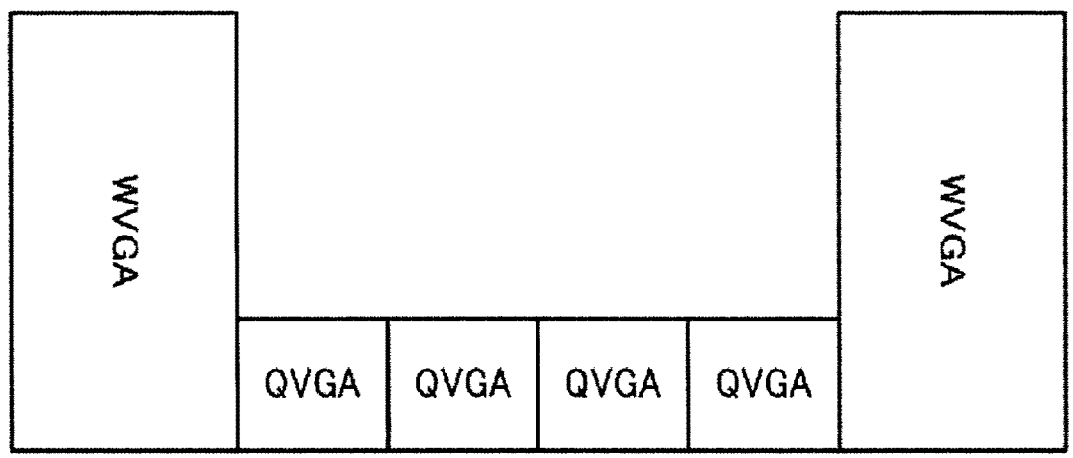
FIG. 15B illustrates a concave display constituted of two WVGAs and four QVGAs according to the embodiment 1.
Figure 15C:
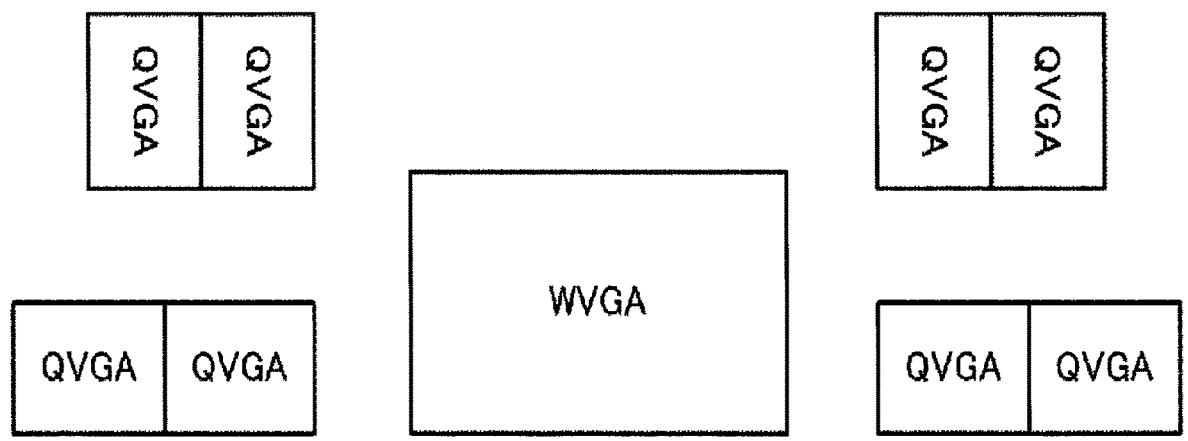
FIG. 15C illustrates a display constituted of one WVGA and eight QVGAs according to the embodiment 1.

FIGS. 15A to 15C are schematic diagrams each illustrating examples of displays constituted of the multiple display modules according to the embodiment 1. FIG. 15A illustrates a horizontally long display constituted of two WVGAs and four QVGAs. FIG. 15B illustrates a concave display constituted of two WVGAs and four QVGAs. The WVGAs are arranged vertically. FIG. 15C illustrates a display constituted of one WVGA and eight QVGAs. In FIG. 15C, the displays are arranged dispersed in five regions.

As illustrated in FIGS. 15A to 15C, it is possible to implement displays in various forms by combining multiple types of display modules; thus, a designer can select optimal display modules according to the location the display is installed or the cost for the display, for example.

Figure 16A:
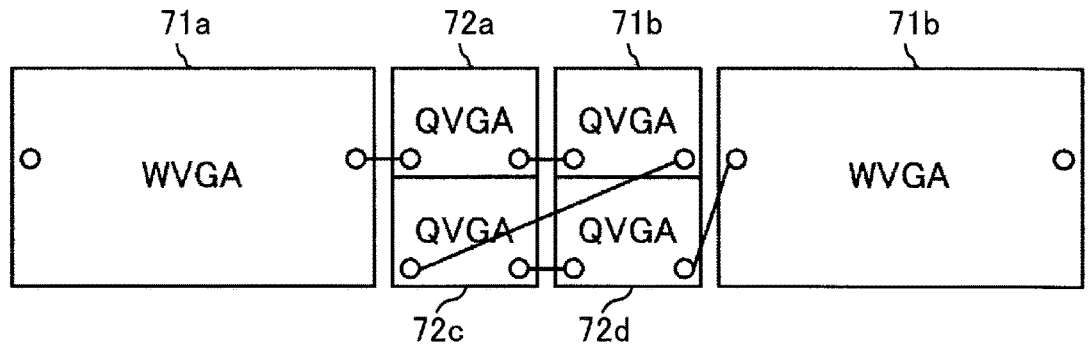
FIG. 16A illustrates the display modules that are connected to each other in the order of 71a, 72a, 72b, 72c, 72d, and 71b according to the embodiment 1.
Figure 16B:
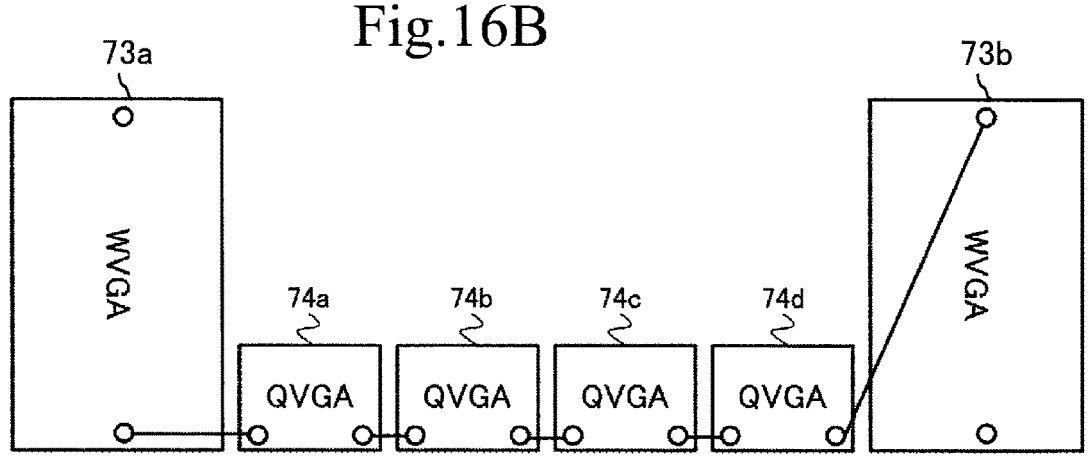
FIG. 16B illustrates the display modules that are connected to each other in the order of 73a, 74a, 74b, 74c, 74d, and 73b according to the embodiment 1.
Figure 16C:
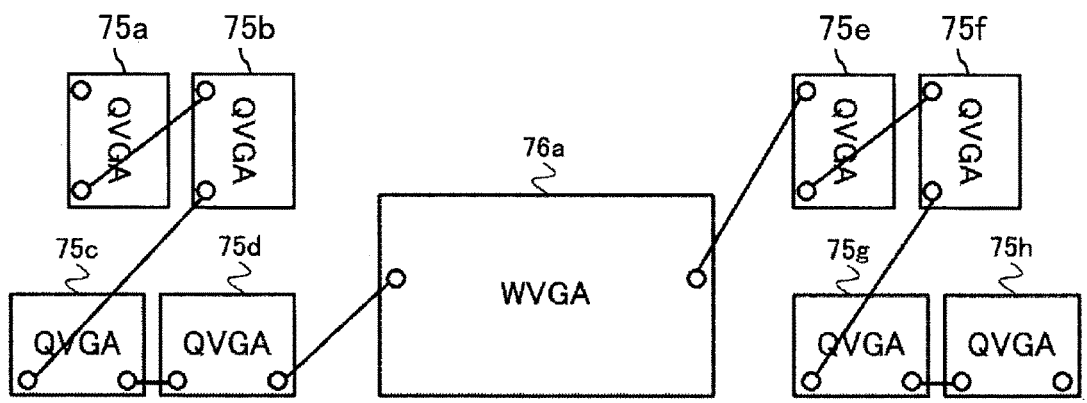
FIG. 16C illustrates the display modules that are connected to each other in the order of 75a, 75b, 75c, 75d, 76a, 75e, 75f, 75g, and 75h according to the embodiment 1.

FIGS. 16A to 16C are schematic diagrams each illustrating the order of connection of the display constituted of the multiple display modules according to the embodiment 1. FIGS. 16A to 16C correspond respectively to FIGS. 15A to 15C. In FIG. 16A, the display modules are connected to each other in the order of 71*a*, 72*a*, 72*b*, 72*c*, 72*d*, and 71*b*. In FIG. 16B, the display modules are connected to each other in the order of 73*a*, 74*a*, 74*b*, 74*c*, 74*d*, and 73*b*. In FIG. 16C, the display modules are connected to each other in the order of 75*a*, 75*b*, 75*c*, 75*d*, 76*a*, 75*e*, 75*f*, 75*g*, and 75*h*. In FIG. 16A, although the display modules 72*a* and 72*c* are arranged above and below in the drawing and the display modules 72*b* and 72*d* are arranged above and below in the drawing, the present invention is applicable by connecting the video delivery apparatus 2 to the display modules sequentially.

It is possible to implement displays in various forms by combining multiple display modules with each other in this manner. In addition, it is possible to implement a video delivery system at low cost by using display modules commercially available at low cost.

Note that, although in this embodiment the video delivery system 1 has a configuration in which the display units 3*a* to 3*f* are connected to the video delivery apparatus 2 in a row, the display units may be connected to the video delivery apparatus 2 in two or more rows.

FIG. 17 is a block diagram illustrating an exemplary configuration of a video delivery system 81 according to the embodiment 1. A video delivery apparatus 82 has the same configuration as the video delivery apparatus 2. Display units are connected to the video delivery apparatus 82 in three rows. The row of display units 83a to 83c is connected to the video information sending processor 14a of the video delivery apparatus 82. The row of display units 83d to 83g is connected to the video information sending processor 14b. The row of display units 83h to 83j is connected to the video information sending processor 14c. The delivery processor 13 acquires layout information of the display units 83a to 83j from the setting unit 11, and determines to which video information sending processor it is to output delivery data. Here, the display units 83a to 83j have the same configuration as the display units 3a to 3f.

Further, although it has been stated in this embodiment that the number of output lines in the setting information 41 of the display modules 26a and 26b and 27a to 27d is set by the user, the number of lines calculated by the setting unit 11 may be set in the setting information 41 instead. The setting unit 11 acquires, from the information on the display modules 26a and 26b and 27a to 27d in the setting information 41, the number of lines according to the orientation of each display module. The number of lines is equal to the number of vertical pixels in the number of pixels if the orientation of the display module is horizontal, and is equal to the number of horizontal pixels in the number of pixels if the orientation of the display module is vertical. The orientation of all the display modules 26a and 26b and 27a to 27d is horizontal, and the number of lines of each of the display modules 26a and 26b is 480 while the number of lines of each of the display modules 27a to 27d is 240. From the number of lines of the display modules 26a and 26b and that of the display modules 27a to 27d, that is 480:240, the setting unit 11 obtains the ratio of the number of lines which is 2:1. The setting unit 11 calculates the number of lines of each of the display modules 26a and 26b at 2 and calculates the number of lines of each of the display modules 27a to 27d at 1, and sets them in the setting information 41.

Further, although the display controller 21a includes one display module interface unit 25a in this embodiment, it may include multiple display module interface units, and each display module interface unit may be connected to multiple display modules.

Further, although the two types of screen modes, which are WVGA and QVGA, are used in this embodiment, three or more types of screen modes may be used instead.

FIG. 18 is a schematic diagram of a table 42 that illustrates the specifications of screen modes according to the embodiment 1. In the table 42, the aspect ratio, the screen mode, and the number of horizontal pixels and the number of vertical pixels are associated with one another. The aspect ratio is a value indicating a screen aspect ratio. For example, in the case of using WVGA, QVGA, and HD 1080, the ratio of the number of lines is WVGA:QVGA:HD 1080=4:2:9. In this case, the division unit 12 outputs, per one control cycle, four lines' video information of WVGA, two lines' video information of QVGA, and nine lines' video information of HD 1080 to the delivery processor 13.

Further, as to the order of delivery of video information to the display units 3a to 3f, although in this embodiment video information is sent to the display units in the ascending order of distance to the video delivery apparatus 2, video information may be sent to the display units in the descending order of distance from the video delivery apparatus 2 or in a random order.

In addition, as to the order of multiplexing pieces of video information into delivery data, the delivery processor 13 may multiplex the pieces of video information addressed to the display modules into delivery data not in the ascending order of distance to the video delivery apparatus 2 but in the reverse order or in a random order.

Further, although it has been stated in this embodiment that video information is input into the division unit 12, the division unit 12 may generate video information instead.

In addition, although it has been stated in this embodiment that delivery data includes video information addressed to the display units 3a to 3f, delivery data may include video information addressed to a part of the display units.

Further, in this embodiment, the physical layer protocol between the video delivery apparatus 2 and the display units 3a to 3f may be a protocol other than Ethernet (registered trademark). The physical layer protocol may be USB or other protocols, or alternatively may be an original protocol. The physical medium may be a medium other than an optical cable. The physical medium may be a coaxial cable or other media.

Further, although it has been stated in this embodiment that the video information reception processor 22a receives a sending signal sent from the video information sending processor 14a of the video delivery apparatus 2, converts the received signal into delivery data, and outputs it to the video information sending processor 23a, the video information reception processor may output the received signal directly to the video information sending processor 23a without conversion into delivery data.

Accordingly, since this embodiment includes: the division unit 12 to divide video information corresponding to one screen, which is to be delivered to each of multiple display modules by the video delivery apparatus 2, into pieces of video information each corresponding to the number of output lines of the display module, and output the information thus divided; and the delivery processor 13 to deliver the video information corresponding to one screen of a display by repetitively delivering, to the multiple display modules, delivery data obtained by multiplexing the pieces of video information corresponding to the number of output lines of the respective plurality of display modules, output from the division unit 12, and control information indicating the target display modules to which the pieces of video information corresponding to the number of output lines are to be delivered respectively, it is possible to reduce the size of the memory held by each of the display controllers 21a to 21f that store video information for the display modules 26a and 26b and 27a to 27d in their memories. To reduce the memory size leads to the reduction of cost. In the case of delivering video information to the display modules 26a and 26b, the information has a volume of 800 pixels×480 lines×24 bits=1152000 bytes for one screen; however, if two lines' information is delivered per one control cycle, the information has a volume of 800 pixels×2 lines×24 bits=4800 bytes. In this way, by delivering one screen's data in a divided manner, each of the display controllers 21a and 21f has only to have a small size memory which would otherwise need a memory with a size larger than 1 Mbyte if one screen's information was delivered.

In addition, since each of the display controllers 21a to 21f includes: any of the video information reception processors 22a and 22b to retrieve, from delivery data addressed to the multiple display modules obtained by multiplexing pieces of video information corresponding to the number of output lines of the respective display modules, video information addressed to the display module connected to the subject device the display controller belongs to and output the retrieved video information; any of the adjustment units 24a and 24b to adjust the speed of the video information for the display module, input from the corresponding one of the video information reception processors 22a and 22b, to a speed suited to the display module and output the adjusted video information; any of the display module interface units 25a and 25b to convert the video information for the display module, input from the adjustment unit, into a signal suited to the interface of the display module and output the signal obtained by the conversion to the display module; and the video information sending processor 23a and 23b to receive the delivered delivery data from the video information reception processor and deliver it to another display module again, it is possible to reduce the size of the memory held by each of the display controllers 21a to 21f. Each of the display controllers 21a to 21f has only to hold a memory with a size large enough to receive and process, per one control cycle, video information corresponding to several lines which is a part of video information corresponding to one screen.

Because the cost of each of the display controllers 21a to 21f can be reduced, the video delivery system can be built at low cost. For example, by using a display module having a standard interface such as DVI (Digital Visual Interface) and HDMI (registered trademark) (High-Definition Multimedia Interface), it is possible to easily make a display meeting the user's request.

Further, because the cost of each of the display controllers 21a to 21f can be reduced, the user can make a choice from a wider range of display module options to make a display. The user can thus select an optimal display module in consideration of the size, resolution, and shape of a desired display.

Embodiment 2

In the embodiment 1 above, the video delivery apparatus delivers video information based on the number of output lines of each display module; on the other hand, this embodiment shows a video delivery apparatus that delivers video information by combining multiple patterns of the number of output lines.

Note that parts that differ from those of the embodiment 1 will be described in this embodiment.

FIG. 19 is a schematic diagram of a table 43 that illustrates the specifications of screen modes according to an embodiment 2. In the table 43, the aspect ratio, the screen mode, the number of horizontal pixels and the number of vertical pixels, and values obtained by factoring the number of vertical pixels into its prime factors are associated with one another. In the embodiment 1, a combination of WVGA and QVGA is shown whose ratio of the number of output lines is 2:1 which is the ratio of small integers. However, the ratio of small integers may not be achieved depending on a combination of display modules.

Figure 20:
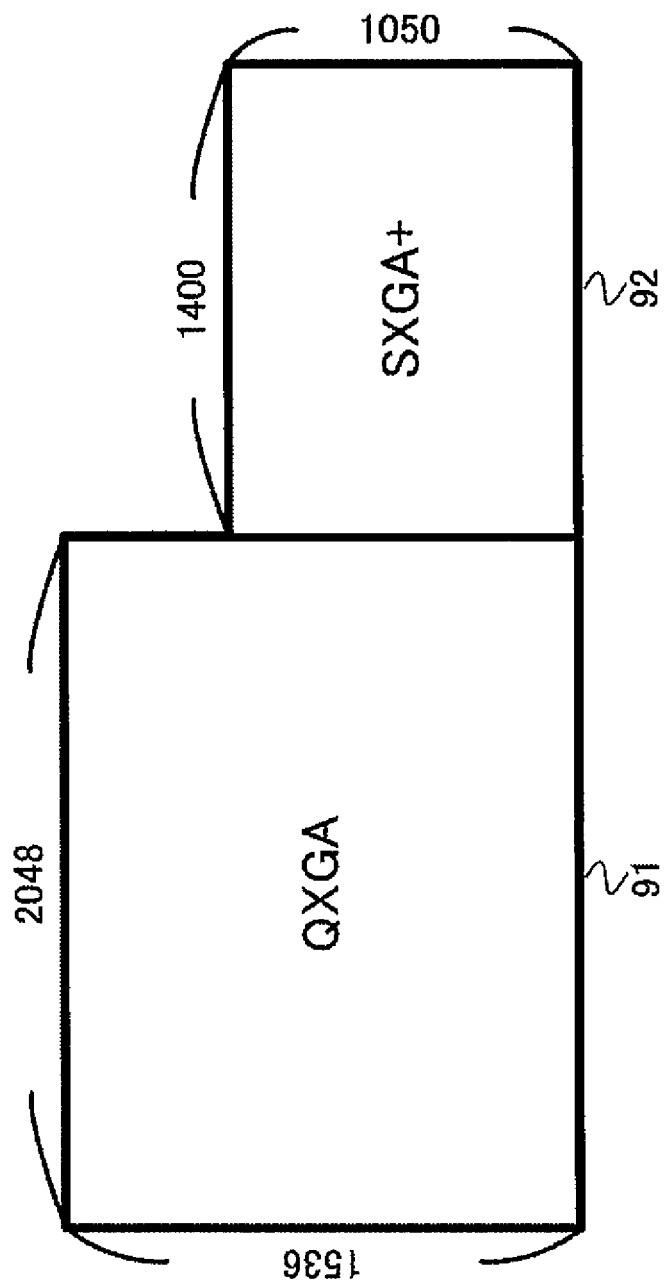
FIG. 20 is a schematic diagram illustrating an example of a display which is a combination of display modules according to the embodiment 2.

FIG. 20 is a schematic diagram illustrating an example of a display which is a combination of display modules 91 and 92 according to the embodiment 2. The display module 91 is QXGA (Quad eXtended Graphics Array), and the display module 92 is SXGA+(Super eXtended Graphics Array plus). In FIG. 20, the display module 91 and the display module 92 are arranged laterally. Since the number of vertical pixels of QXGA is 1536 pixels and that of SXGA+ is 1050 pixels, the ratio of the number of output lines between QXGA and SXGA+ is 256:175.

Figure 21:
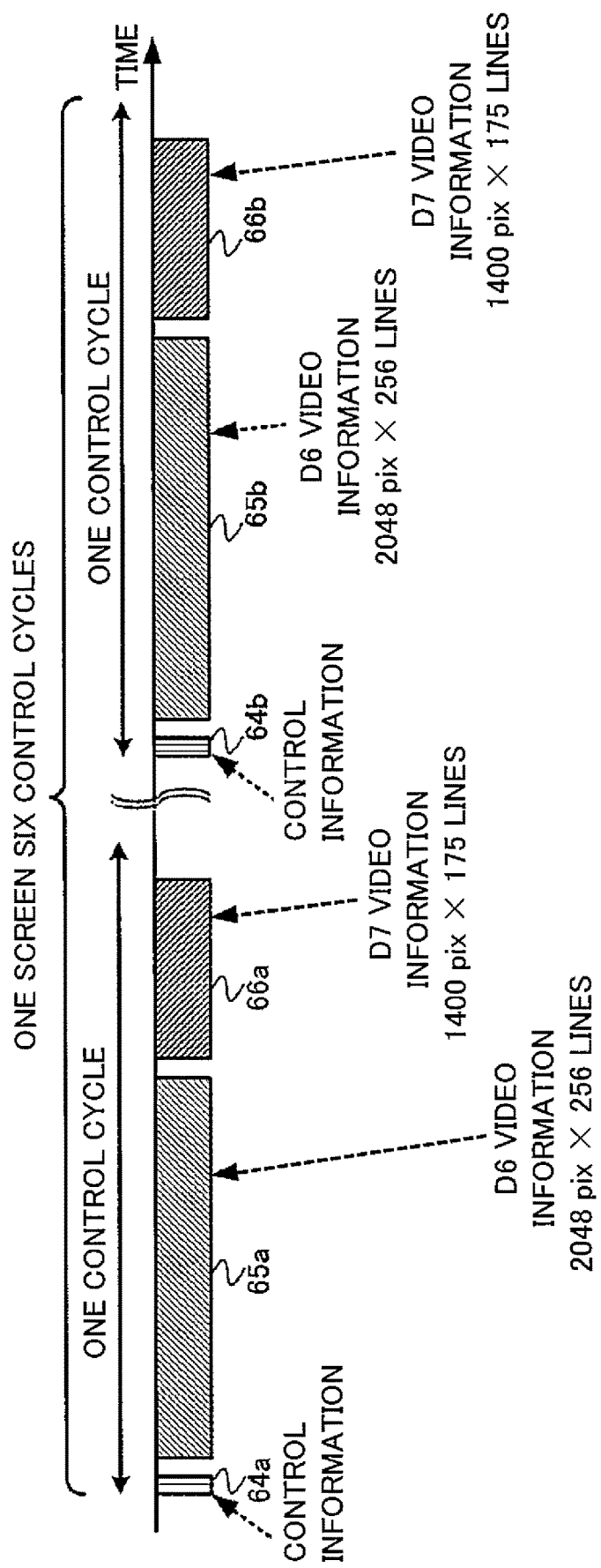
FIG. 21 is a schematic diagram illustrating signals delivered by a video delivery apparatus according to the embodiment 2.

FIG. 21 is a schematic diagram illustrating delivery data delivered by a video delivery apparatus according to the embodiment 2. Reference numerals 64a and 64b indicate control information. Reference numerals 65a and 65b indicate video information addressed to the display module 91 while reference numerals 66a and 66b indicate video information addressed to the display module 92. Per one control cycle, the video information 65a and 65b for the display module 91 each have a volume of 2048 pixels×256 lines×24 bits=1572864 bytes, and the video information 66a and 66b for the display module 92 each have a volume of 1400 pixels×175 lines×24 bits=735000 bytes. If the ratio of the number of output lines takes a large value, the volume of information to be delivered per one control cycle is large, and therefore each of the adjustment units 24a and 24b of the target display units has to have a large memory.

To cope with this, in this embodiment, the video delivery apparatus delivers video information to the display units by combining patterns of the ratio of the number of output lines.

Figure 22:
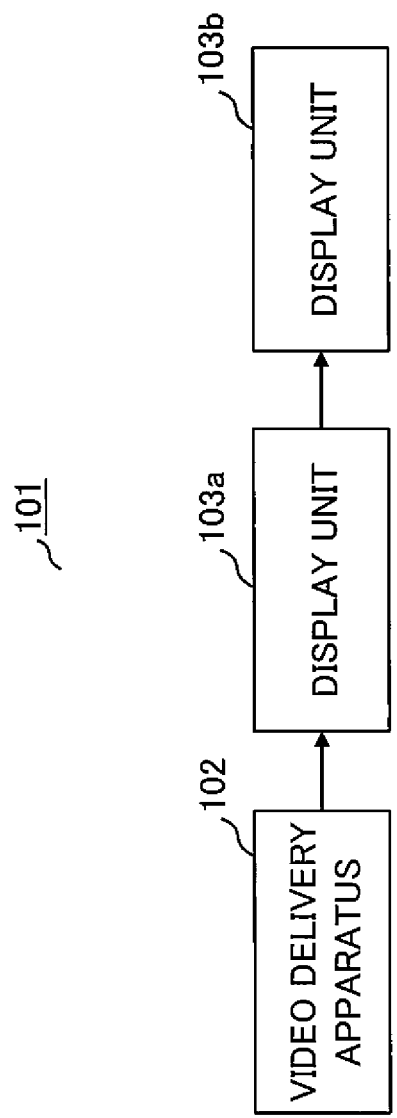
FIG. 22 is a block diagram illustrating an exemplary configuration of a video delivery system according to the embodiment 2.

FIG. 22 is a block diagram illustrating an exemplary configuration of a video delivery system 101 according to the embodiment 2. The video delivery system 101 is equipped with a video delivery apparatus 102 and display units 103a and 103b.

Figure 23:
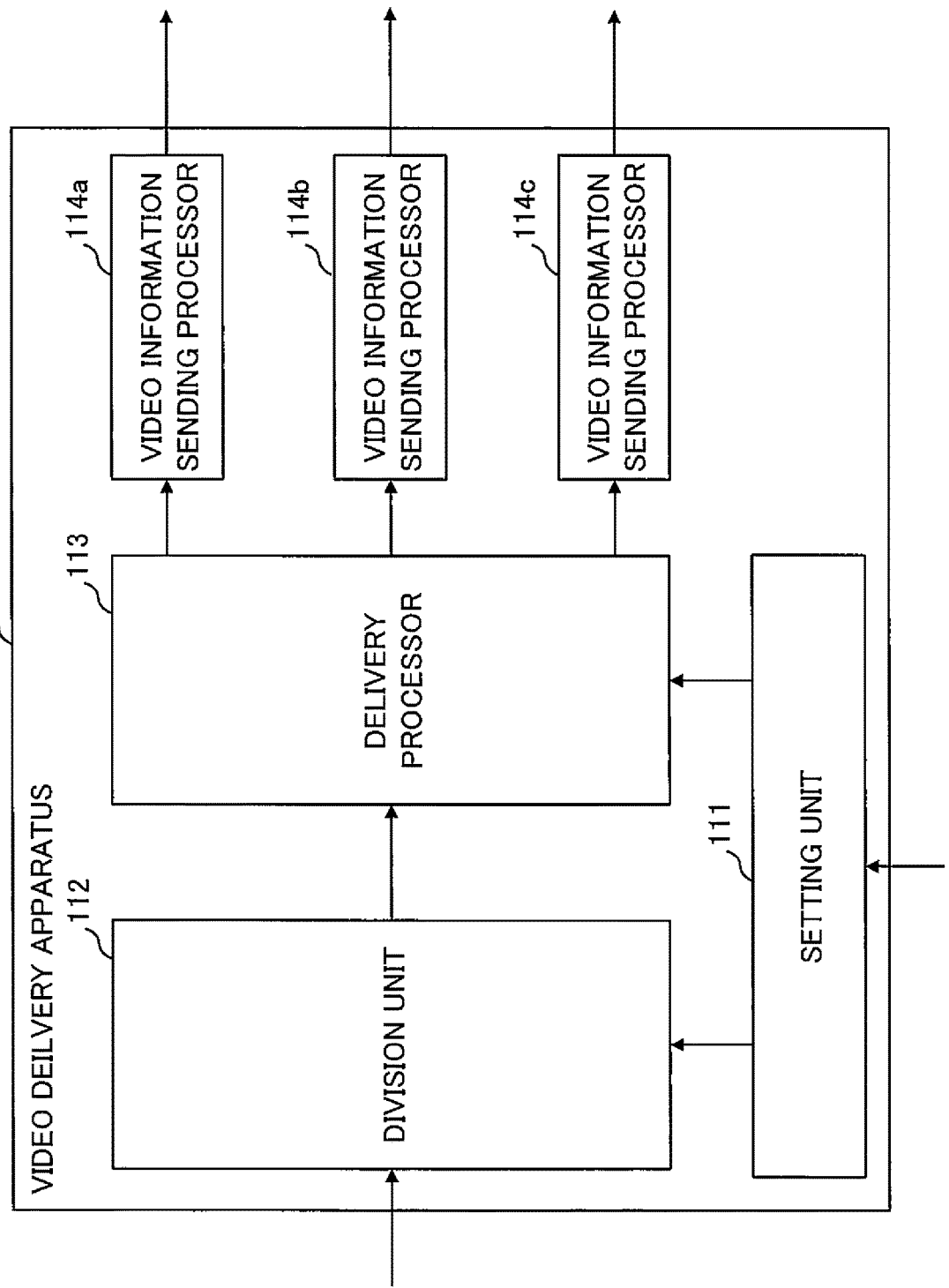
FIG. 23 is a block diagram illustrating an exemplary functional configuration of the video delivery apparatus according to the embodiment 2.

FIG. 23 is a block diagram illustrating an exemplary functional configuration of the video delivery apparatus 102 according to the embodiment 2. The video delivery apparatus 102 includes: a setting unit 111; a division unit 112; a delivery processor 113; and video information sending processors 114a to 114c. The video delivery apparatus 102 has the same configuration as the video delivery apparatus 2 in the embodiment 1.

Figure 24:
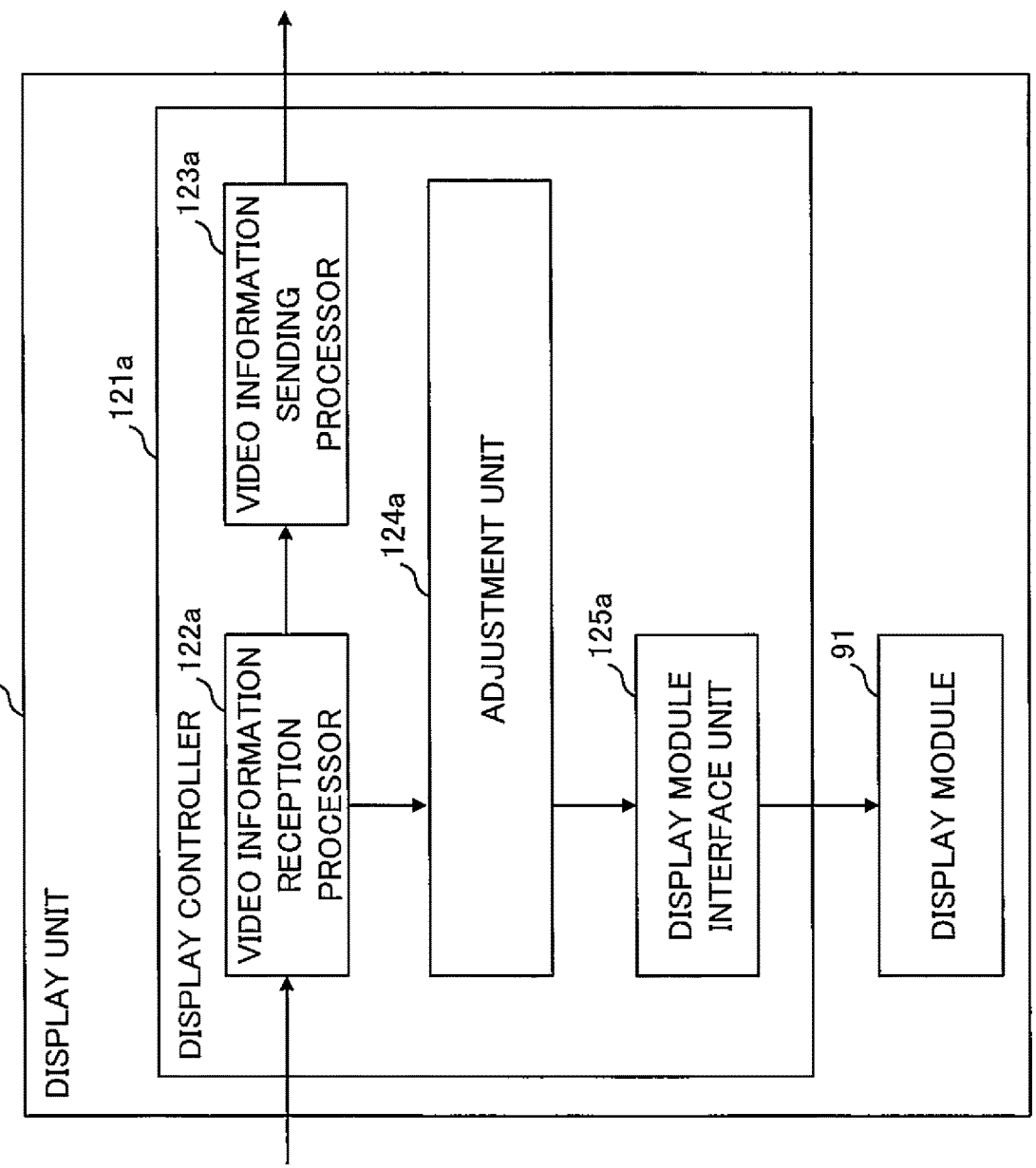
FIG. 24 is a block diagram illustrating an exemplary functional configuration of a display unit according to the embodiment 2.

FIG. 24 is a block diagram illustrating an exemplary functional configuration of the display unit 103a according to the embodiment 2. The display unit 103a is equipped with a display controller 121a and the display module 91. The display controller 121a includes: a video information reception processor 122a; a video information sending processor 123a; an adjustment unit 124a; and a display module interface unit 125a. The display controller 121a has the same configuration as the display controller 21a in the embodiment 1.

Figure 25:
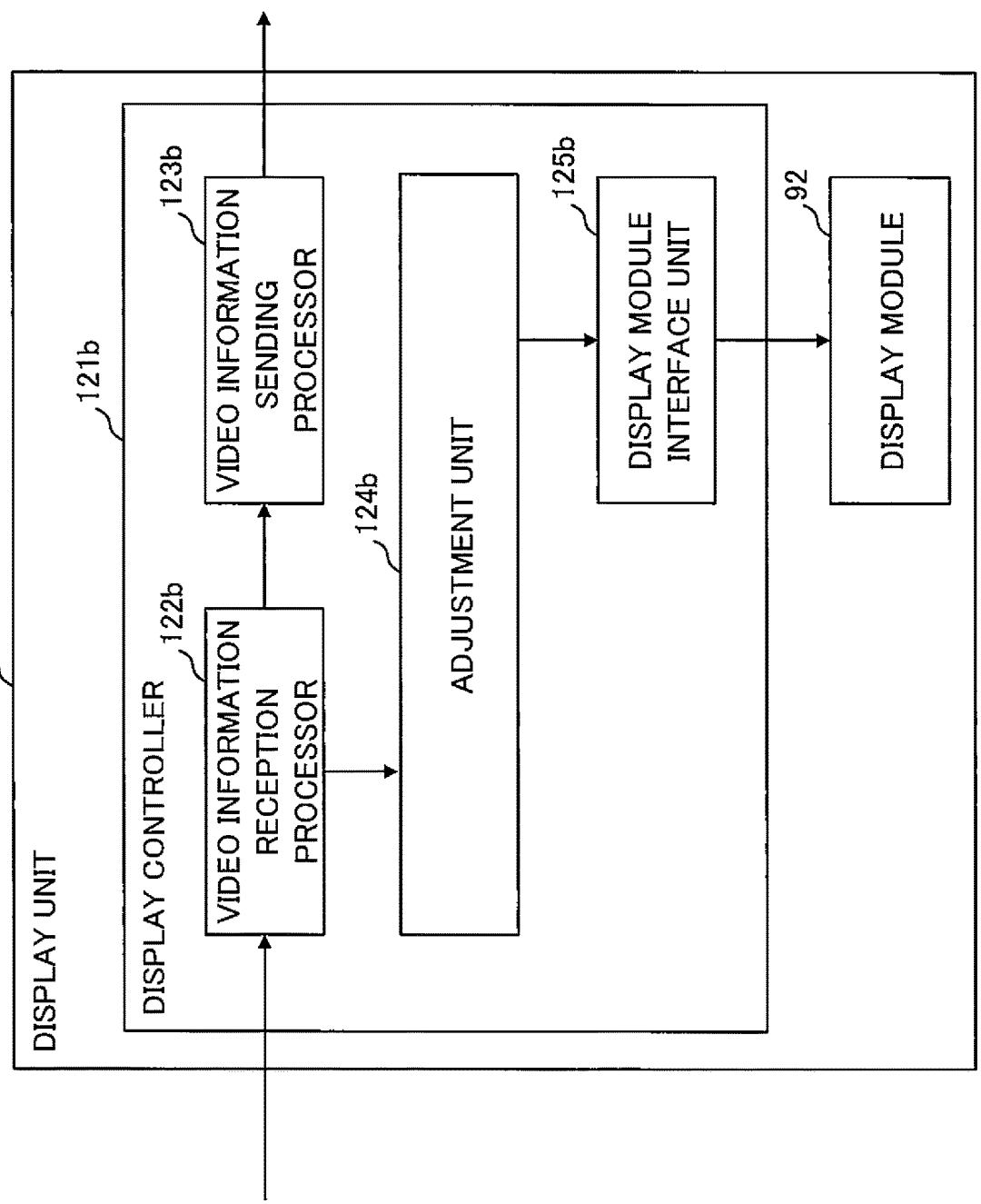
FIG. 25 is a block diagram illustrating an exemplary functional configuration of a display unit according to the embodiment 2.

FIG. 25 is a block diagram illustrating an exemplary functional configuration of the display unit 103b according to the embodiment 2. The display unit 103b is equipped with a display controller 121b and the display module 92. The display controller 121b includes: a video information reception processor 122b; a video information sending processor 123b; an adjustment unit 124b; and a display module interface unit 125b. The display controller 121b has the same configuration as the display controller 21a in the embodiment 1.

FIG. 26 is a schematic diagram illustrating an example of display module setting information 44 held by the setting unit 111 according to the embodiment 2. In the display module setting information 44, the ID of each of the display modules 91 and 92 is associated with its mode, screen orientation, number of patterns of the number of output lines, and patterns of the number of output lines. The patterns of the number of output lines include patterns A to C. In each pattern, the number of output lines and the number of times to be delivered are associated with each other. Although not illustrated in FIG. 26, the resolution, the number of colors displayed, and the frequency are also associated with one another in the display module setting information 44.

A pattern set in the setting information 44 is one obtained by combining the ratio of 3:2, which is an approximate value of 1536:1050 being the ratio of the number of output lines between QXGA and SXGA+, and another ratio of the number of lines to reduce a data volume to be delivered in one control cycle. The ratio of the number of output lines in the pattern A is 3:2, the ratio of the number of output lines in the pattern B is 4:2, and the ratio of the number of output lines in the pattern C is 3:3. The pattern set in the setting information 44 is one such that the pattern A is repeated 474 times, the pattern B is repeated 6 times, and the pattern C is repeated 30 times and thereby one screen's video information is delivered with 510 times of control cycles.

Figure 27:
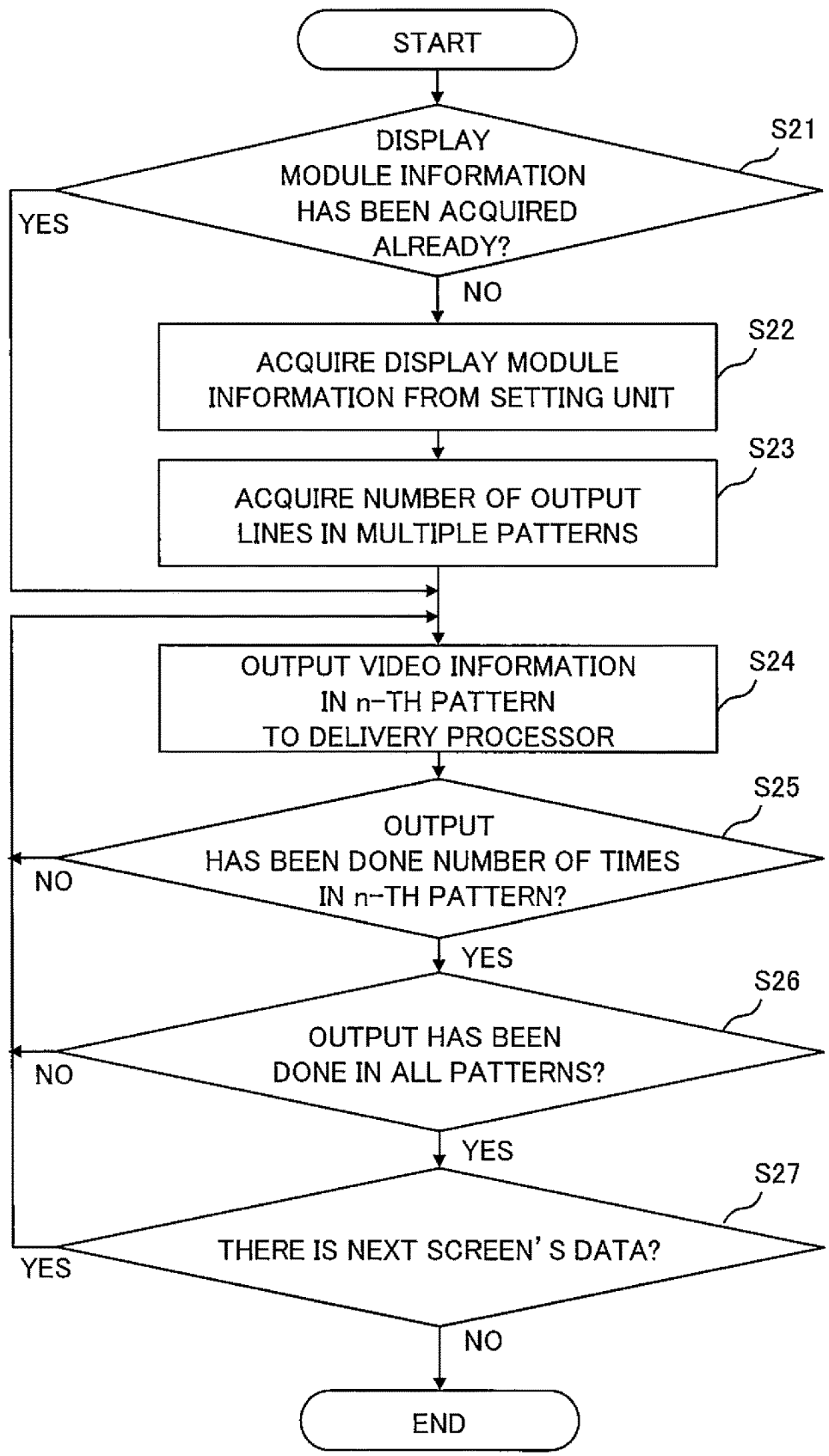
FIG. 27 is a flowchart illustrating processing executed by a division unit according to the embodiment 2.

FIG. 27 is a flowchart illustrating processing executed by the division unit 112 according to the embodiment 2. Upon input of video information, the division unit 112 starts processing from Step S21.

In Step S21, the division unit 112 judges whether setting information of the display modules 91 and 92 has been acquired already. If it has not been acquired yet, the process proceeds to Step S22. If it has been acquired already, the process proceeds to Step S24. The processing in Step S21 is the same as the processing in Step S11 of FIG. 10.

In Step S22, the division unit 112 acquires, from the setting unit 111, the information on the number of display units, the number of display modules, and the layout of the display modules and the setting information 44 of the display modules 91 and 92. The processing in Step S22 is the same as the processing in Step S12 of FIG. 10.

In Step S23, the division unit 112 acquires, from the setting information 44, the number of output lines and the number of times to be delivered in each of the multiple patterns.

In Step S24, based on the input video information, the division unit 112 associates one control cycle's video information in the n-th pattern with the IDs of the target display modules and outputs this information to the delivery processor 113. The division unit 112 holds a counter to store the number of times output, and increments the counter. In this embodiment, n is any of 1 to 3. The first pattern indicates the pattern A, the second pattern indicates the pattern B, and the third pattern indicates the pattern C.

In Step S25, the division unit 112 judges, by the counter value, whether output has been done the number of times output specified in the n-th pattern. If output has been done already, the division unit 112 resets the counter to 0, and the process proceeds to Step S26. If output has not been done yet, the process proceeds to Step S24.

In Step S26, the division unit 112 judges whether it has output video information in all of the patterns. If it has not output video information in all of the patterns yet, the process proceeds to Step S24. In Step S24, the division unit 112 associates one control cycle's video information in the next pattern with the IDs of the target display modules and outputs this information to the delivery processor 113. The division unit 112 iterates the processing in Steps S24 to S26 until it finishes delivering video information in all the patterns. If it has output video information in all of the patterns already, the process proceeds to Step S27.

In Step S27, the division unit 112 judges whether there is next screen's video information. If there is next screen's video information, the process proceeds to Step S24. If there is no next screen's video information, the process terminates.

Figure 28:
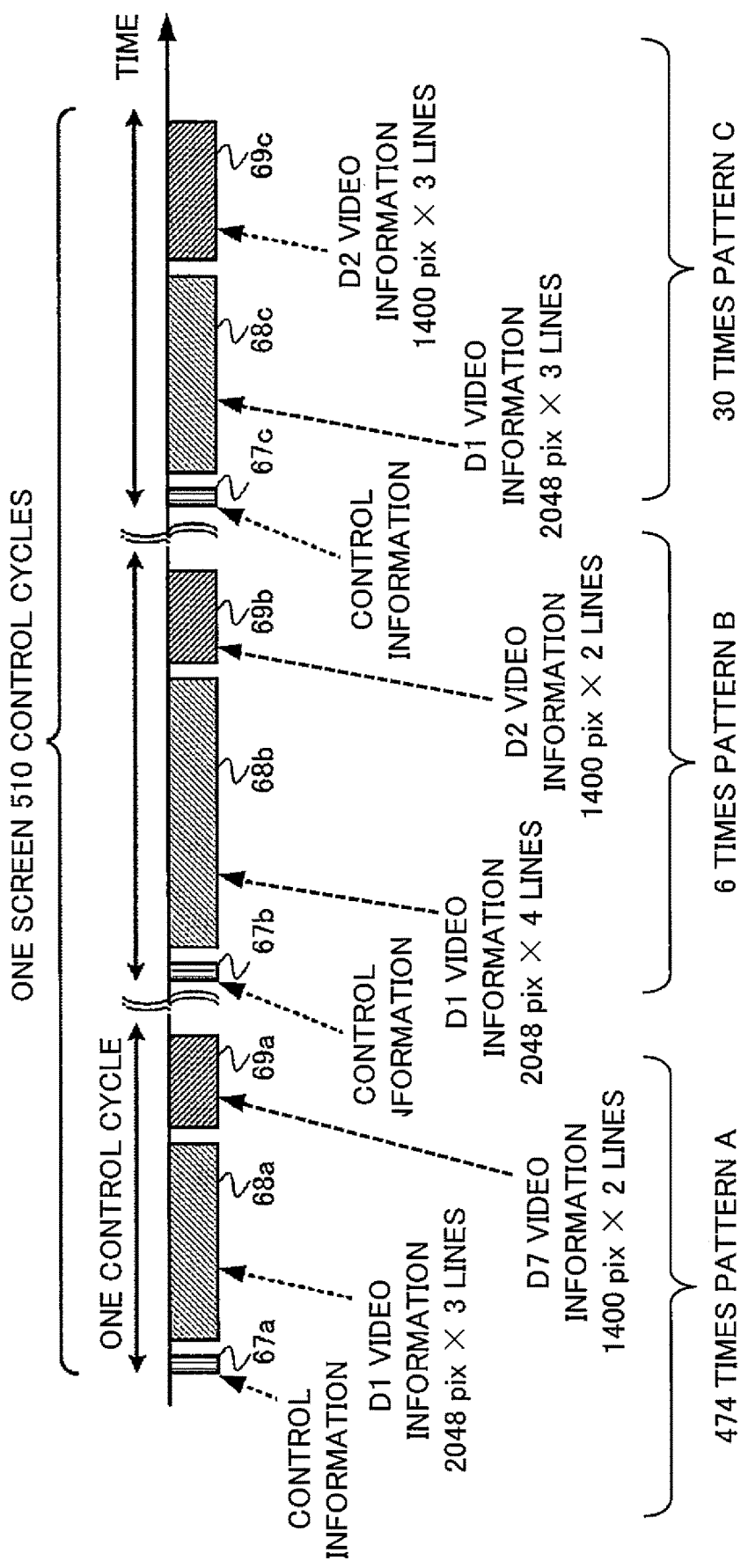
FIG. 28 is a schematic diagram illustrating signals delivered by the video delivery apparatus according to the embodiment 2.

FIG. 28 is a schematic diagram illustrating delivery data delivered by the video delivery apparatus 102 according to the embodiment 2. Reference numerals 67a to 67c indicate control information. Reference numerals 68a to 68c indicate video information addressed to the display module 91 while reference numerals 69a to 69c indicate video information addressed to the display module 92. The patters A to C employ the different ratios of the number of output lines for delivering video information. In the pattern A, the ratio of the number of output lines is 3:2. The video delivery apparatus 102 delivers control information and video information to the display units 103a and 103b in the pattern A 474 times. The ratio of the number of output lines of 3:2 is an approximate value of 1536:1050 being the ratio of the number of lines between QXGA and SXGA+. The video information 68a addressed to the display module 91 has a volume of 2048 pixels×3 lines×24 bits=18432 bytes per one control cycle. The video information 69a addressed to the display module 92 has a volume of 1400 pixels×2 lines×24 bits=8400 bytes per one control cycle.

In the pattern B, the ratio of the number of output lines is 4:2. The video delivery apparatus 102 delivers control information and video information to the display units 103a and 103b in the pattern B 6 times. The video information 68b addressed to the display module 91 has a volume of 2048 pixels×4 lines×24 bits=24576 bytes per one control cycle. The video information 69b addressed to the display module 92 has a volume of 1400 pixels×2 lines×24 bits=8400 bytes per one control cycle.

In the pattern C, the ratio of the number of output lines is 3:3. The video delivery apparatus 102 delivers control information and video information to the display units 103a and 103b in the pattern C 30 times. The video information 68c addressed to the display module 91 has a volume of 2048 pixels×3 lines×24 bits=18432 bytes per one control cycle. The video information 69c addressed to the display module 92 has a volume of 1400 pixels×3 lines×24 bits=12600 bytes per one control cycle. One screen's video information is thus delivered with 510 times of control cycles.

By delivering video information using the patterns A to C in combination, it is possible to significantly reduce the size of a memory held by each of the adjustment units 124a and 124b as compared to the case of delivering video information in the ratio of the number of output lines 256:175.

Accordingly, during delivery of one screen's video information of one of the multiple display modules, the division unit 112 changes the value of the number of output lines for this display module, and outputs video information corresponding to the number of output lines thus changed. Thereby, even when the ratio of the number of lines between the multiple display modules is not the ratio of small integers, it is possible to reduce the data volume of video information to be delivered to each display unit per one control cycle. No matter what kind of specifications the multiple display modules constituting the display may have, it is possible to reduce the data volume of video information to be delivered to each display unit per one control cycle as long as appropriate patterns are set. Thereby, it is possible to reduce the size of a memory held by each of the display controllers 121a and 121b.

Embodiment 3

In the Embodiment 1 above, video information is delivered based on the number of output lines of each display module; on the other hand, this embodiment shows a case of delivering information based on the number of lines and the frequency.

In the embodiment 1, the display modules 26a and 26b and the display modules 27a to 27d have the same frequency 60 Hz. This embodiment shows a case where the frequency of each of the display modules 26a and 26b, 30 Hz, differs from the frequency of each of the display modules 27a to 27d, 60 Hz.

Note that parts that differ from those of the embodiment 1 will be described in this embodiment.

FIG. 29 is a schematic diagram illustrating an example of display module setting information 45 held by the setting unit 11 according to an embodiment 3. The difference between the setting information 45 and the setting information 41 is that the number of output lines of each of the display modules 26a and 26b is 1.

The number of lines of each of the display modules 26a and 26b is 480 while the number of lines of each of the display modules 27a to 27d is 240. The ratio of the number of lines between WVGA and QVGA is 480:240=2:1. The frequency of each of the display modules 26a and 26b, 30 Hz, is half the frequency of each of the display modules 27a to 27d, 60 Hz. Based on the ratio of the number of lines and the frequency, the number of output lines of each of the display modules 26a and 26b is set at 2×½=1. The number of output lines is set by the user in advance.

Note that, although the number of output lines of each display module is previously set in the setting information 45 in this embodiment, the setting unit 11 may calculate it based on the number of lines and the frequency and set it in the setting information 45.

Accordingly, since the division unit 12 divides video information corresponding to one screen of each display module into pieces of video information each corresponding to the number of output lines of the display module according to the ratio of the number of lines and the ratio of the frequency, indicating the refresh rate, between the multiple display modules, it is possible to reduce the data volume of video information to be delivered to each display unit per one control cycle in consideration of the difference in frequency. Thereby, it is possible to reduce the size of a memory held by each of the display controllers 21a to 21f.

Besides, since the division unit 12 divides video information corresponding to one screen of each display module into pieces of video information each corresponding to the number of output lines of the display module according to the ratio of the number of lines and the ratio of the number of pixel colors displayed between the multiple display modules, it is possible to reduce the data volume of video information to be delivered to each display unit per one control cycle in consideration of the difference in the number of colors displayed. Thereby, it is possible to reduce the size of a memory held by each of the display controllers 21a to 21f.

Embodiment 4

In the embodiment 1 above, the setting unit 11 holds the setting information in advance; on the other hand, this embodiment shows a case of collecting setting information from the display units.

Note that parts that differ from those of the embodiment 1 will be described in this embodiment.

Figure 30:
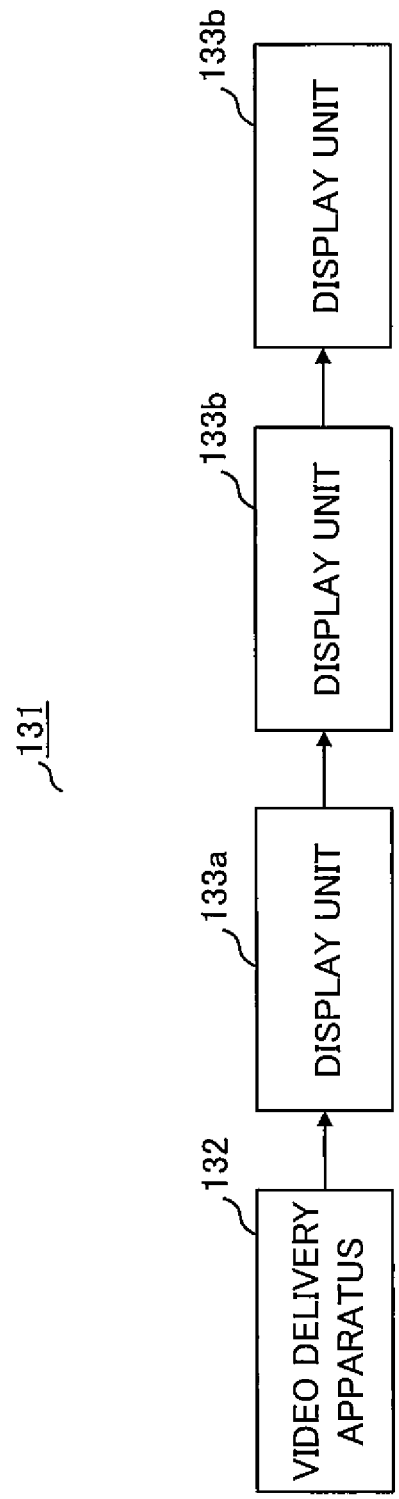
FIG. 30 is a block diagram illustrating an exemplary configuration of a video delivery system according to an embodiment 4.

FIG. 30 is a block diagram illustrating an exemplary configuration of a video delivery system 131 according to an embodiment 4. The video delivery system 131 is equipped with a video delivery apparatus 132 and display units 133a to 133c. The video delivery apparatus 132 delivers video information to the display units 133a to 133c.

Figure 31:
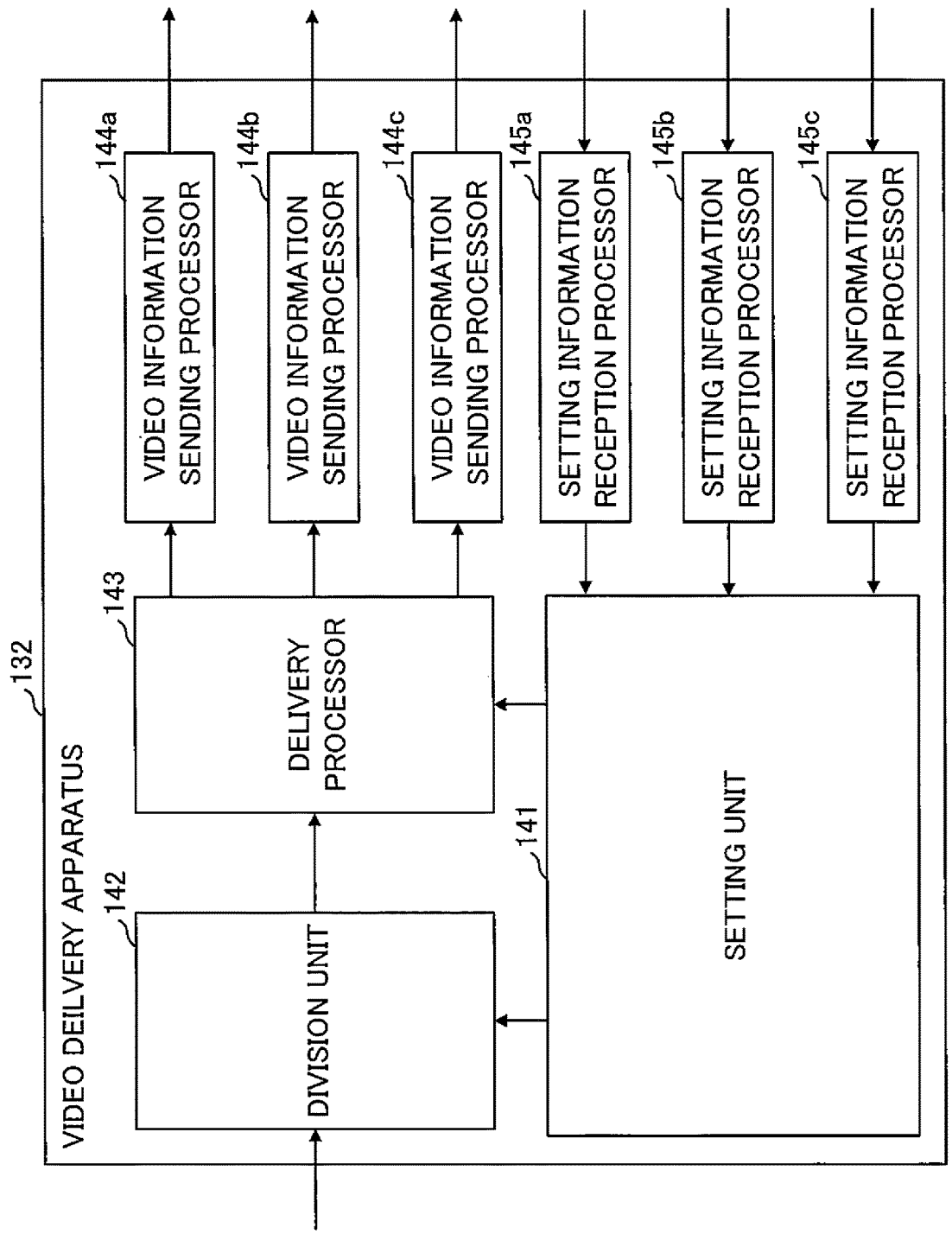
FIG. 31 is a block diagram illustrating an exemplary functional configuration of a video delivery apparatus according to the embodiment 4.

FIG. 31 is a block diagram illustrating an exemplary functional configuration of the video delivery apparatus 132 according to the embodiment 4. The video delivery apparatus 132 includes: a setting unit 141; a division unit 142; a delivery processor 143; video information sending processors 144a to 144c; and setting information reception processors 145a to 145c. The video delivery apparatus 132 has a configuration in which the setting information reception processors 145a to 145c are added to the video delivery apparatus 2 of the embodiment 1.

The video delivery apparatus 132 includes the three video information sending processors 144a to 144c and the three setting information reception processors 145a to 145c according to the physical number of connectors to be connected to the display units. However, as illustrated in the video delivery system 131 in FIG. 30, the display units 133a to 133c are connected to each other in a row, and the display unit 133a is connected to the video information sending processor 144a and the setting information reception processor 145a. The video information sending processors 144b and 144c and the setting information reception processors 145b and 145c execute no processing because they are not connected to any display unit.

The setting information reception processor 145a is configured to receive setting information from the display units 133a to 133c and output the display module setting information to the setting unit 141. The setting unit 141 holds the display module setting information input from the setting information reception processors 145a to 145c, and is configured to output the display module setting information held therein in response to a request from the division unit 142.

The hardware configuration of the video delivery apparatus 132 is the same as the hardware configuration of the video delivery apparatus 2 of the embodiment 1. The memory 31 stores therein programs and data for implementing the setting information reception processors 145a to 145c. The processor 32 is configured to retrieve the programs and data stored in the memory 31 to implement the functions of the setting information reception processors 145a to 145c. The apparatus may have a configuration such that multiple processing circuits work together to execute the functions of the setting information reception processors 145a to 145c.

Figure 32:
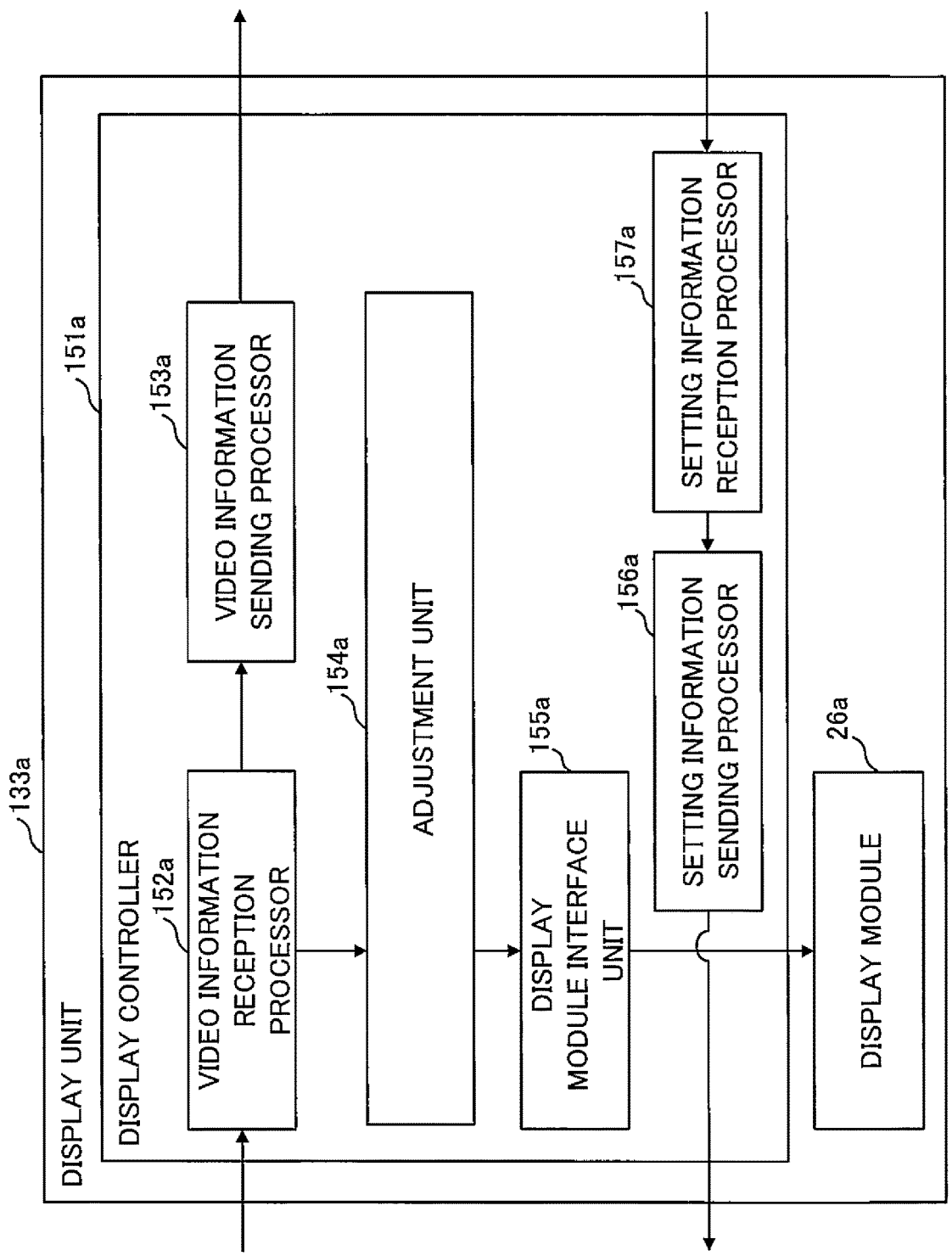
FIG. 32 is a block diagram illustrating an exemplary functional configuration of a display unit according to the embodiment 4.

FIG. 32 is a block diagram illustrating an exemplary functional configuration of the display unit 133a according to the embodiment 4. The display unit 133a is equipped with a display controller 151a and the display module 26a. The display controller 151a includes: a video information reception processor 152a; a video information sending processor 153a; an adjustment unit 154a; a display module interface unit 155a; a setting information sending processor 156a; and a setting information reception processor 157a. The display controller 151a has a configuration in which the setting information sending processor 156a and the setting information reception processor 157a are added to the display controller 21a of the embodiment 1.

Figure 33:
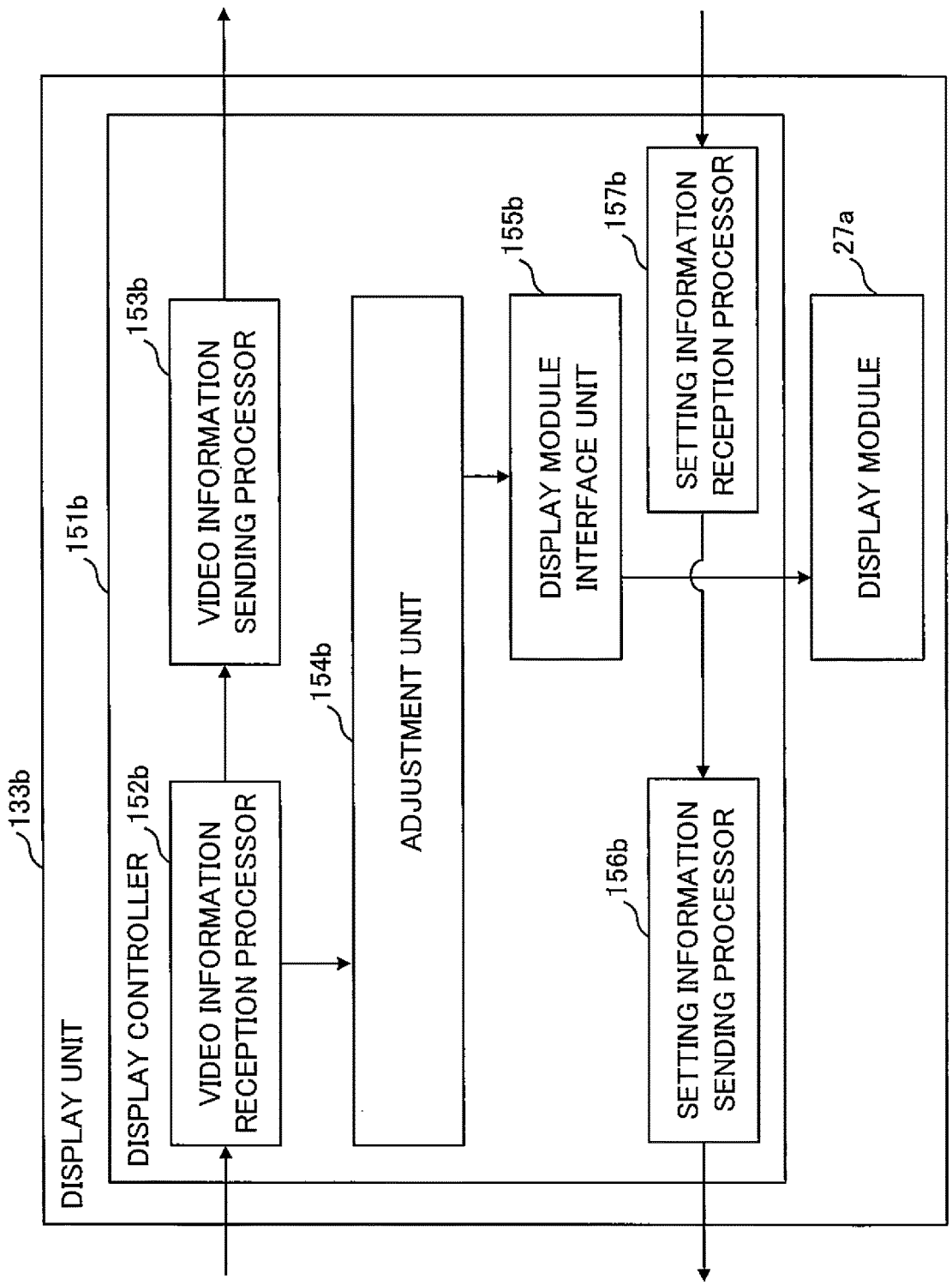
FIG. 33 is a block diagram illustrating an exemplary functional configuration of a display unit according to the embodiment 4.

FIG. 33 is a block diagram illustrating an exemplary functional configuration of the display unit 133b according to the embodiment 4. The display unit 133b is equipped with a display controller 151b and the display module 27a. The display controller 151b includes: a video information reception processor 152b; a video information sending processor 153b; an adjustment unit 154b; a display module interface unit 155b; a setting information sending processor 156b; and a setting information reception processor 157b. The display controller 151b has the same configuration as the display controller 151a.

The display unit 133c is equipped with a display controller 151c and the display module 27b. The display controller of the display unit 133c has the same configuration as the display controller 151b and is therefore not illustrated here. The display controller 151c includes: a video information reception processor 152c; a video information sending processor 153c; an adjustment unit 154c; a display module interface unit 155c; a setting information sending processor 156c; and a setting information reception processor 157c.

The hardware configuration of the display controller 151a of the display unit 133a is the same as the hardware configuration of the display controller 21a of the embodiment 1. The memory 33 stores therein programs and data for implementing the setting information sending processor 156a and the setting information reception processor 157a. The processor 34 is configured to retrieve the programs and data stored in the memory 33 to implement the functions of the setting information sending processor 156a and the setting information reception processor 157a. The display controller may have a configuration such that multiple processing circuits work together to execute the functions of the setting information sending processor 156a and the setting information reception processor 157a.

The display units 133b and 133c each have the same hardware configuration as the display unit 133a.

Next, a description is given of an operation performed when, in a state where the display units 133a and 133b are connected to the video delivery apparatus 132, the display unit 133c is additionally connected to the display unit 133b. At this time, the setting unit 141 of the video delivery apparatus 132 holds the setting information of the display modules 26a and 27a.

In the state where the display units 133a and 133b are connected to the video delivery apparatus 132, the setting unit 141 of the video delivery apparatus 132 holds the setting information of the display modules 26a and 27a. The setting information indicates the ID, mode, orientation, resolution, number of colors displayed, and frequency of each of the display modules 26a and 27a. The setting information sending processor 156a of the display unit 133a holds the setting information of the display module 26a in advance. The setting information includes the ID, mode, orientation, resolution, number of colors displayed, and frequency of the display module 26a. Meanwhile, the setting information sending processor 156b of the display unit 133b holds the setting information of the display module 27a in advance. Meanwhile, the setting information sending processor 156c of the display unit 133c holds the setting information of the display module 27b in advance.

Once the display unit 133c is connected to the display unit 133b, the setting information sending processor 156c of the display unit 133c outputs the setting information of the display module 27b held therein to the display unit 133b. At this time, the setting information sending processor 156c executes signal processing in the same manner as the video information sending processor 153c to convert the setting information into a sending signal, and outputs the sending signal to the display unit 133b.

The setting information reception processor 157b of the display unit 133b receives the setting information of the display module 27b by executing signal processing in the same manner as the video information reception processor 152b to convert the sending signal into the setting information. The setting information reception processor 157b outputs the setting information of the display module 27b, received from the display unit 133c, to the setting information sending processor 156b. The setting information sending processor 156b executes signal processing on the setting information of the display module 27b to convert it into a sending signal, and outputs the sending signal to the display unit 133a. The display unit 133a outputs the received setting information of the display module 27b to the video delivery apparatus 132. The operation of the display unit 133a is the same as that of the display unit 133b and therefore not described here.

The setting information reception processor 145a of the video delivery apparatus 132 receives the setting information of the display module 27b by executing signal processing on the sending signal from the display unit 133a to convert it into the setting information. The setting information reception processor 145a outputs the setting information of the display module 27b to the setting unit 141. The setting unit 141 additionally holds the setting information of the display module 27b. Upon addition of the setting information, the setting unit 141 calculates the number of output lines of each of the display module 26a and the display modules 27a and 27b.

Note that, although it has been stated in this embodiment that the setting unit 141 calculates the number of output lines in the setting information, the user may set the number of output lines based on the setting information. Alternatively, as shown in the embodiment 2, the user may set multiple combination patterns of the number of output lines.

In addition, in the video delivery apparatus 132 of this embodiment, any of physically different cables and one cable may be used to connect both the video information sending processor 144a and the setting information reception processor 145a to the display unit 133a.

Accordingly, since the apparatus includes the setting information reception processor 145a that receives setting information including the number of lines of the display module and the setting unit 141 holds the value of the number of output lines of each of the multiple display modules set based on the setting information received by the setting information reception processor 145a, it is possible to collect the setting information of each display module without the user's hands when the configuration of the display module is changed.

REFERENCE SIGNS LIST 1, 81, 101, 131: video delivery system, 2, 82, 102, 132: video delivery apparatus, 3a to 3f, 103a and 103b, 133a to 133c: display unit, 11, 111, 141: setting unit, 12, 112, 142: division unit, 13, 113, 143: delivery processor, 14a to 14c, 114a to 114c, 144a to 144c: video information sending processor, 21a and 21b, 121a and 121b, 151a to 151c: display controller, 22a and 22b, 122a and 122b, 152a to 152c: video information reception processor, 23a and 23b, 123a and 123b, 153a to 153c: video information sending processor, 24a and 24b, 124a and 124b, 154a to 154c: adjustment unit, 25a and 25b, 125a and 125b, 155a to 155c: display module interface unit, 26a and 26b, 27a to 27d, 71a and 71b, 72a to 72d, 73a and 73b, 74a to 74d, 75a to 75h, 76a, 91 and 92: display module, 83a to 83j: display unit, 30: display, 31, 33: memory, 32, 34: processor, 35: panel, 36: drive circuit, 41, 44, 45: setting information, 42, 43: table, 51a and 51b, 52a to 52d: queue, 61a, 64a and 64b, 67a to 67c: control information, 62a to 62f, 65a and 65b, 66a and 66b, 68a to 68c, 69a to 69c: video information, 63a: data, 145a to 145c, 157a to 157c: setting information reception processor, 156a to 156c: setting information sending processor.

The invention claimed is:
1. A video delivery apparatus comprising:
processing circuitry to,
divide video information corresponding to one screen, which is to be delivered to each of a plurality of display modules constituting a display, into pieces of video information each corresponding to the number of output lines, which is N times (N is an integer of one or greater) a line indicating pixels per one line of the corresponding display module, and output the pieces of video information corresponding to the number of output lines for each of the plurality of display modules, and deliver the video information corresponding to one screen of the display by repetitively delivering, to the plurality of display modules, delivery data obtained by multiplexing the pieces of video information corresponding to the number of output lines of the respective plurality of display modules, and control information indicating the target display modules to which the pieces of video information corresponding to the number of output lines are to be delivered respectively, wherein the processing circuitry divides the video information corresponding to one screen of each display module into the pieces of video information corresponding to the number of output lines, according to a ratio of the number of lines between the plurality of display modules.

2. The video delivery apparatus according to claim 1, wherein the processing circuitry divides the video information corresponding to one screen of each display module into the pieces of video information corresponding to the number of output lines, according to the ratio of the number of lines and a ratio of a frequency, indicating a refresh rate, between the plurality of display modules.

3. The video delivery apparatus according to claim 1, wherein the processing circuitry divides the video information corresponding to one screen of each display module into the pieces of video information corresponding to the number of output lines, according to the ratio of the number of lines and a ratio of the number of pixel colors displayed between the plurality of display modules.

4. The video delivery apparatus according to claim 1, wherein the processing circuitry:

calculates a value of the number of output lines for each of the plurality of display modules and hold the value of the number of output lines of each of the plurality of display modules, and based on the value of the number of output lines of each of the plurality of display modules, divides the video information corresponding to one screen of the display module.

5. The video delivery apparatus according to claim 4, wherein the processing circuitry:

holds a plurality of patterns in each of which a combination of the values of the number of output lines and the number of times to be delivered with the combination are associated with each other, outputs, for each of the plurality of display modules, the pieces of video information corresponding to the number of output lines of the display module based on the plurality of patterns held by the processing circuitry, and delivers, for each of the plurality of patterns, the delivery data obtained by multiplexing the pieces of video information corresponding to the number of output lines of the respective plurality of display modules associated with the pattern, by the number of times of delivery associated with the pattern.

6. The video delivery apparatus according to claim 4, wherein the processing circuitry:

receives setting information that includes the number of lines of each of the display modules, and holds the value of the number of output lines of each of the plurality of display modules set based on the setting information received.

7. The video delivery apparatus according to claim 1, wherein, during delivery of the video information corresponding to one screen of one of the plurality of display modules, the processing circuitry changes the value of the number of output lines for the one display module, and outputs video information corresponding to the number of output lines thus changed.

8. The video delivery apparatus of claim 1, wherein each piece of video information contains less than all of the video information for a single screen.

9. A display controller comprising:

processing circuitry to:

retrieve, from delivery data addressed to a plurality of display modules, constituting a display, obtained by multiplexing pieces of video information each corresponding to N times (N is an integer of one or greater) a line indicating pixels per one line of the corresponding display module and being a part of video information corresponding to one screen of the display module, video information addressed to a display module connected to a subject device the display controller belongs to and output the retrieved video information;

adjust the speed of the video information for the display module, to a speed suited to the display module and output the adjusted video information;

convert the video information for the display module, into a signal suited to an interface of the display module and output the signal obtained by the conversion to the display module; and receive the delivery data and deliver the delivery data to a different display module again;

wherein the processing circuitry holds setting information including the number of lines of the display module and send the setting information to a video delivery apparatus from which the video information is delivered; and wherein the processing circuitry:

outputs the setting information of the different display module received from the different display module, and transfers the setting information of the different display module, to the video delivery apparatus.

10. The display controller of claim 9, wherein each piece of video information contains less than all of the video information for a single screen.

11. A video delivery system comprising:

a video delivery apparatus that comprises:

processing circuitry to:

divide video information corresponding to one screen, which is to be delivered to each of a plurality of display modules constituting a display, into pieces of video information each corresponding to the number of output lines, which is N times (N is an integer of one or greater) a line indicating pixels per one line of the corresponding display module, and output the pieces of video information corresponding to the number of output lines for each of the plurality of display modules, and deliver the video information corresponding to one screen of the display by repetitively delivering, to the plurality of display modules, delivery data obtained by multiplexing the pieces of video information corresponding to the number of output lines of the respective plurality of display modules, and control information indicating the target display modules to which the pieces of video information corresponding to the number of output lines are to be delivered respectively, wherein the processing circuitry divides the video information corresponding to one screen of each display module into the pieces of video information corresponding to the number of output lines, according to a ratio of the number of lines between the plurality of display modules; and a display controller that comprises:

processing circuitry to:

retrieve, from the delivery data, video information addressed to the display module connected to a subject device the display controller belongs to and output the retrieved video information, adjust the speed of the video information for the display module connected to the subject device to a speed suited to the display module connected to the subject device and output the adjusted video information, convert the video information for the display module connected to the subject device, into a signal suited to an interface of the display module connected to the subject device and output the signal obtained by the conversion to the display module connected to the subject device, and receive the delivery data and deliver the delivery data to a different display module again.

12. The video delivery system of claim 11, wherein each piece of video information contains less than all of the video information for a single screen.

* * * * *